United States Patent
Cho et al.

(10) Patent No.: US 8,545,717 B2
(45) Date of Patent: *Oct. 1, 2013

(54) COMPOSITION COMPRISING CURABLE DICHROIC DYE FOR FORMING OPTICAL COMPONENT AND AN OPTICAL COMPONENT PREPARED USING THE SAME

(75) Inventors: Yong Il Cho, Daejeon (KR); Dae Hee Lee, Deajeon (KR); Sin Young Kim, Daejeon (KR); Hee Jean Lee, Daejeon (KR); Su Young Ryu, Daejeon (KR)

(73) Assignee: LG Chem, Ltd., Seoul (KR)

( * ) Notice: Subject to any disclaimer, the term of this patent is extended or adjusted under 35 U.S.C. 154(b) by 633 days.

This patent is subject to a terminal disclaimer.

(21) Appl. No.: 12/450,021

(22) PCT Filed: Jul. 4, 2008

(86) PCT No.: PCT/KR2008/003977
§ 371 (c)(1),
(2), (4) Date: Sep. 8, 2009

(87) PCT Pub. No.: WO2009/005330
PCT Pub. Date: Jan. 8, 2009

(65) Prior Publication Data
US 2010/0055353 A1  Mar. 4, 2010

(30) Foreign Application Priority Data

Jul. 5, 2007 (KR) .................... 10-2007-0067559
Jul. 5, 2007 (KR) .................... 10-2007-0067560

(51) Int. Cl.
| | |
|---|---|
| C09K 19/52 | (2006.01) |
| C09K 19/06 | (2006.01) |
| C09K 19/34 | (2006.01) |
| C09K 19/32 | (2006.01) |
| C09K 19/30 | (2006.01) |
| C09K 19/20 | (2006.01) |
| C09K 19/12 | (2006.01) |
| C09K 19/22 | (2006.01) |
| C09K 19/36 | (2006.01) |
| C09K 19/00 | (2006.01) |
| G02F 1/1337 | (2006.01) |
| C09B 44/08 | (2006.01) |

(52) U.S. Cl.
USPC ............ 252/299.01; 252/299.6; 252/299.61; 252/299.62; 252/299.63; 252/299.64; 252/299.65; 252/299.66; 252/299.67; 252/299.68; 252/299.7; 428/1.1; 428/1.2; 349/1; 349/56; 349/123; 534/610; 534/612; 528/363; 526/259

(58) Field of Classification Search
USPC ............... 252/299.01, 299.6–299.7; 430/20; 428/1.1, 1.2; 349/1, 56, 123; 534/610, 612; 528/363; 526/259
See application file for complete search history.

(56) References Cited

U.S. PATENT DOCUMENTS

| | | | | |
|---|---|---|---|---|
| 4,983,479 | A | | 1/1991 | Broer et al. |
| 5,114,612 | A | * | 5/1992 | Benicewicz et al. ..... 252/299.01 |
| 5,833,880 | A | | 11/1998 | Siemensmeyer et al. |
| 5,968,414 | A | * | 10/1999 | Min et al. ................. 252/299.66 |
| 6,337,111 | B1 | | 1/2002 | Ichihashi |
| 6,398,370 | B1 | | 6/2002 | Chiu et al. |
| 7,419,620 | B2 | * | 9/2008 | Buchecker et al. ....... 252/299.01 |
| 7,811,642 | B2 | * | 10/2010 | Peglow et al. ................ 428/1.1 |
| 8,197,708 | B2 | * | 6/2012 | Cho et al. ................. 252/299.01 |
| 2004/0164272 | A1 | | 8/2004 | Buchecker et al. |
| 2006/0188663 | A1 | | 8/2006 | Peglow et al. |
| 2009/0290214 | A1 | * | 11/2009 | Cho et al. ........................ 359/491 |
| 2010/0066950 | A1 | * | 3/2010 | Cho et al. ........................ 349/106 |

FOREIGN PATENT DOCUMENTS

| | | |
|---|---|---|
| DE | 11 2007 001 910 T5 | 3/2008 |
| DE | 11 2007 002 796 T5 | 5/2008 |
| EP | 0 608 924 | 8/1994 |
| JP | 2-6927 | 1/1990 |
| JP | 11-513360 | 11/1999 |
| JP | 2002-116456 | 4/2002 |
| JP | 2003-255328 | 9/2003 |
| JP | 2005-215435 | 8/2005 |
| JP | 2006-525382 | 11/2006 |
| KR | 10-2007-0003185 | 1/2004 |
| KR | 10-2005-0032468 | 4/2005 |
| WO | WO 2005/105932 | 11/2005 |
| WO | WO 2008/030024 A1 | 3/2008 |
| WO | WO 2008/063033 A1 | 5/2008 |

* cited by examiner

*Primary Examiner* — Geraldina Visconti
(74) *Attorney, Agent, or Firm* — McKenna Long & Aldridge, LLP

(57) ABSTRACT

The present invention relates to a composition comprising a curable dichroic dye and a curable liquid crystal compound, which are used to prepare an optical component that is vertically oriented to give a narrow viewing angle, to form an optical component, and an optical component comprising an optical component layer prepared using the same. There is provided a composition for forming an optical component comprising 0.1-90 parts by weight of a dichroic dye and 10-98.85 parts by weight of a curable liquid crystal compound, and there is also provided an optical component comprising an optical component layer in which a curable liquid crystal compound and a curable dichroic dye are vertically oriented. The optical component comprising an optical component layer in which a curable dichroic dye and a curable liquid crystal compound are vertically oriented and which is made of the composition comprising a curable dichroic dye and a curable liquid crystal compound for forming an optical component has excellent physical properties such as heat resistance, durability to high temperature and high moisture, vertical orientation and dichroic ratio, and also adjust a narrow viewing angle. The durability in the high temperature and high moisture is due to the cross linking shape of the optical component layer.

14 Claims, 13 Drawing Sheets

COMPOSITION COMPRISING CURABLE DICHROIC DYE FOR FORMING OPTICAL COMPONENT AND AN OPTICAL COMPONENT PREPARED USING THE SAME

This application claims the benefit of PCT/KR2008/003977 filed on Jul. 4, 2008 which claims priority to Korean Patent Application No. 10-2007-0067559 filed on Jul. 5, 2007 and Korean Patent Application No. 10-2007-0067560 filed on Jul. 5, 2007, all of which are hereby incorporated herein by reference for all purposes in their entirety.

TECHNICAL FIELD

The present invention relates to a composition comprising a curable dichroic dye and a curable liquid crystal compound to form an optical component and an optical component prepared using the same, and more particularly, to a composition comprising a curable dichroic dye and a curable liquid crystal compound, which are used to prepare an optical component that is vertically oriented to give a narrow viewing angle, and an optical component prepared using the same.

BACKGROUND ART

Recently, liquid crystal displays have become as the most powerful displays with which the Braun tube (a cathode ray tube) may be substituted since the liquid crystal displays have an advantage that they are light-weight and driven at low power consumption. In particular, a thin film transistor liquid crystal display (TFT-LCD) driven by a thin film transistor independently drives respective pixels, and therefore the TFT-LCD has been increasingly used in the field of various applications such as notebook computers, wall-mounted TV and the like since the TFT-LCD may display a high-quality moving image due to the very rapid response time of liquid crystal.

In general, a color thin film transistor-liquid crystal display, which is manufactured by disposing linearly polarized components in outer surfaces of two glass substrates in the manufacture of the liquid crystal display, and forming additional anisotropic films on the linearly polarized components, is used to display information by adjusting the capacity of light transmitted from the rear of the liquid crystal display in addition to the reaction of liquid crystal molecules between the glass substrates, and ensure a wide viewing angle through an anisotropic film.

However, when small portable electronic equipments, for example notebook computers, personal digital assistants (PDA), players, mobile phones and the like, are increasingly used in public places for personal purposes, it is necessary to make a viewing angle narrow in consideration of user's private lives. Also, a glare problem may be made serious by external light as the displays are manufactured with a larger scale. In this case, a viewing angle control layer preventing external light from entering the displays is required to enhance the contrast of the displays.

U.S. Pat. No. 6,398,370 discloses a method for manufacturing a film having a function to adjust a viewing angle by forming a pattern in which a black ink layer is vertically aligned in the film in a blind form so as to prevent light from being transmitted at a predetermined viewing angle. However, the technique has disadvantages that the manufacturing process is complicated, and the thickness of the final product is high since the final product is prepared by stacking two films.

U.S. Pat. No. 6,337,111 discloses a thin film and a method for manufacturing the same, wherein the thin film has light absorption anisotropy that is able to easily achieve the attenuation, polarization, scattering and interception of lights comprising laser light and natural light. In the U.S. patent, it is described that an optically anisotropic thin film is produced by forming an orientation film of prescribed mode on a transparent or semitransparent substrate, applying a solution of a dichroic dye in a solvent to the orientation film, and fixing the orientation of the dichroic dye by evaporating the solvent from the dichroic dye solution, wherein the dichroic dye is an azo or anthraquinone dyes, and has liquid crystalline properties and photo- or thermal cross-linking reactive group. However, when a vertically oriented film is formed only of the dichroic dye, the vertically oriented film has problems that its viewing angle is very narrow, which makes it difficult to adjust a viewing angle.

Korean Patent Laid-open Publication No. 2005-0032468 discloses that a film having a narrow viewing angle is prepared by coating a film with a discotic liquid crystal absorbing visible lights. However, the film is difficult to use for the purpose of adjusting a viewing angle since the dichroic dye has a high absorbance.

Korean Patent Laid-open Publication No. 2007-0003185 discloses that a dichroic liquid crystal layer made of mixture of liquid crystal molecules and a dichroic dye is interposed in a liquid crystal display device and dichroic liquid crystals are tilted in an angle range from 0 to 90 in driving the liquid crystal display device in a narrow viewing angle mode. In the case of the patent, it is, however, possible to form a narrow viewing angle in liquid crystal display device by tilting a dichroic dye in respect to a vertical orientation mode when an electrical signal is applied to the dichroic dye.

Japanese Patent Laid-open Publication No. 2005-215435 discloses a viewing angle control member comprising a light-transmissive base substrate; and a viewing angle control layer formed on the base substrate to control the visibility of a subject to be viewed according to the viewing angle. In the patent publication, the viewing angle control layer comprises a dichroic dye and a polymerizable liquid crystal whose molecules are in a rod type, and each of the dichroic dye and the polymerizable liquid crystal has a molecule array fixed in a homeotropic alignment state.

Also, Japanese Patent Laid-open Publication No. 2005-215435 discloses that the viewing angle control member has good visibility to a subject to be viewed in a normal direction, and therefore serves to protect a user's privacy from being exposed to others. However, the use of a non-polymerizable dichroic dye may cause fine phase separation in curing a polymerizable liquid crystal. In this case, when the non-polymerizable dichroic dye is added at a content of 5% or more, the front transmittance and narrow viewing angle characteristics may be deteriorated, and the entire physical properties of the film may be deteriorated due to the aging effect that is spread out of the film when the film is formed and used.

Furthermore, European Patent Application No. 0 608 924 discloses a liquid crystal polymeric film in which liquid crystal molecules are oriented homeotropically, comprising at least one dichroic dye. However, when the liquid crystal is oriented while being mixed in the polymeric film or attached to a side chain of the polymeric film, the entire orientation of the liquid crystal may be worsened, which leads to the deteriorated physical properties of the final product.

Accordingly, the conventional methods actually has problems that a function of adjust a narrow viewing angle is poor, or the durability of the final product is deteriorated, and the manufacturing cost is high.

DISCLOSURE OF INVENTION

Technical Problem

An aspect of one embodiment of the present invention provides a composition comprising a curable dichroic dye and a curable liquid crystal compound to form an optical component, wherein the manufacturing process is simple and the curable dichroic dye and the optical compound serves to adjust a viewing angle and improve the visibility.

Another aspect of one embodiment of the present invention provides an optical component having a narrow viewing angle and excellent physical properties such as visibility, orientation, heat resistance and durability.

Technical Solution

According to one embodiment of the present invention, there is provided a composition for forming an optical component comprising 0.1-90 parts by weight of a curable dichroic dye and 10-98.85 pails by weight of a curable liquid crystal compound.

According to another embodiment of the present invention, there is provided an optical component comprising an optical component layer in which a curable liquid crystal compound and a curable dichroic dye are vertically oriented, the optical component being prepared using the composition for forming an optical component.

According to still another embodiment of the present invention, there is provided an optical component comprising a base substrate and an optical component layer in which a curable liquid crystal compound and a curable dichroic dye are vertically oriented, the optical component layer being formed on the base substrate and made of the composition for forming an optical component of one embodiment of the present invention.

According to still another embodiment of the present invention, there is provided an optical component comprising an oriented base substrate and an optical component layer in which a curable liquid crystal compound and a curable dichroic dye are vertically oriented, the optical component layer being formed on the base substrate and made of the composition for forming an optical component of one embodiment of the present invention.

According to yet another embodiment of the present invention, there is provided an optical component comprising a base substrate, an alignment layer formed on the base substrate and an optical component layer in which a curable liquid crystal compound and a curable dichroic dye are vertically oriented, the optical component layer being formed on the alignment layer and made of the composition for forming an optical component of one embodiment of the present invention.

Advantageous Effects

The optical component according to one embodiment of the present invention comprising an optical component layer in which a curable dichroic dye and a curable liquid crystal compound are vertically oriented and which is made of the composition comprising a curable dichroic dye and a curable liquid crystal compound for forming an optical component has excellent physical properties such as heat resistance, durability to high temperature and high moisture, vertical orientation and dichroic ratio, and also adjust a viewing angle, specifically, a narrow viewing angle and shows improved visibility.

BEST MODE FOR CARRYING OUT THE INVENTION

Figure 1:
FIG. 1 is a side cross-sectional view illustrating an optical component comprising an optical component layer formed on a base substrate according to one embodiment of the present invention.

As small portable electronic equipments, for example notebook computers, personal digital assistants (PDA), players, mobile phones and the like, are increasingly used in public places for personal purposes, it is necessary to make a viewing angle narrow in consideration of users private lives. The present invention is characterized in that a viewing angle is adjusted using an optical component layer in which a curable liquid crystal compound and a curable dichroic dye are vertically oriented. Also, since an optical component comprising the optical component layer has an external light control function, the visibility of the optical component is improved.

The composition for forming an optical component according to one embodiment of the present invention comprises 0.1-90 parts by weight of a curable dichroic dye and 10-98.85 parts by weight of a curable liquid crystal compound. When the content of the dichroic dye is less than 0.1 pails by weight, the viewing angle control function of the optical component is deteriorated in the optical component. On the contrary, when the content of the dichroic dye exceeds 90 parts by weight, the viewing angle control function of the optical component is deteriorated in the optical component, and the degree of cure and durability of the optical component are deteriorated. When the content of the curable liquid crystal compound is less than 10 parts by weight, the front transmittance of the optical component is poor, whereas the viewing angle control function of the optical component is deteriorated in the optical component when the content of the curable liquid crystal compound exceeds 98.85 parts by weight.

The curable liquid crystal compound functions to improve orientation of the dichroic dye, and examples of the curable liquid crystal compound include, but are not particularly limited to, 4-(3-acryloyloxy-propoxy)benzoic acid o-tolyl ester, etc.

Also, the examples of the curable liquid crystal compound include, but are not particularly limited to, compounds represented by the following formulas, and they may be used alone or in combinations thereof.

P—S—M—R (a)

P1—S1—M—S1—P1 (b)

P1—S1—M—S2—P2
        |
        S3
        |
        P3 (c)

P3
        |
        S3
        |
P1—S1—M—S2—P2
        |
        S4
        |
        P4 (d)

wherein, P through P4 may be curable functional groups selected from the reactive functional groups that have been generally known in the art. Examples of the reactive functional groups include, but are not particularly limited to,

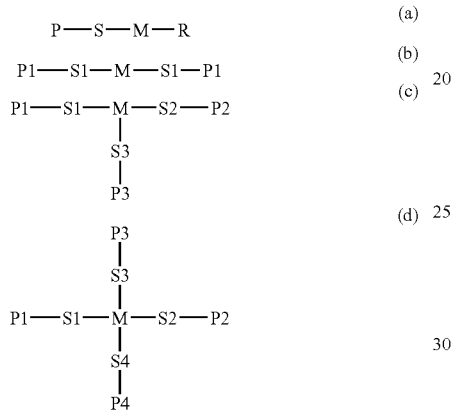

P1 through P3 in the formula (c) and P1 through P4 in the formula (d) may be identical to or different from each other, may be each independently selected from the group consisting of the reactive functional groups.

In the formulas (a) to (d), S through S4 are linking structures, and the linking stricture may be selected from any of linking structures that have been generally known in the art. Examples of the linking structures include, but are not particularly limited to,

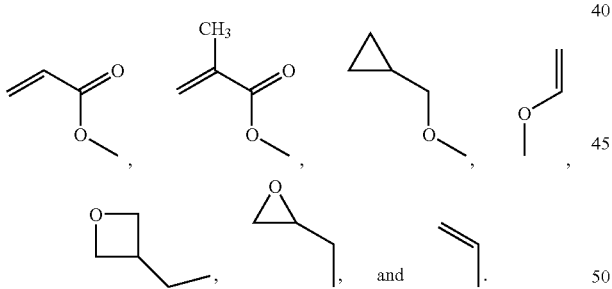

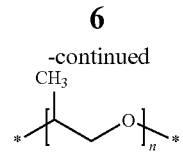

(wherein, n is integer ranging from 1 to 12). S1 through S3 in the formula (c) and S1 through S4 in the formula (d) may be identical to or different from each other, may be each independently selected from the group consisting of the linking strictures.

A liquid crystalline stricture M may be any of chemical structures that have been generally known in the art to have liquid crystalline properties.

Examples of the liquid crystalline structure M include, but are not particularly limited to:

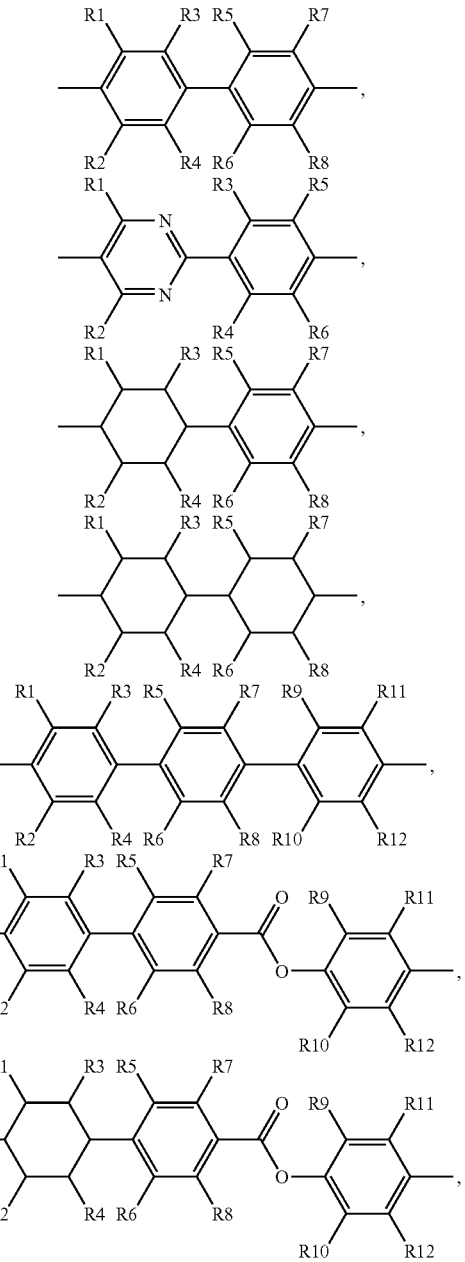

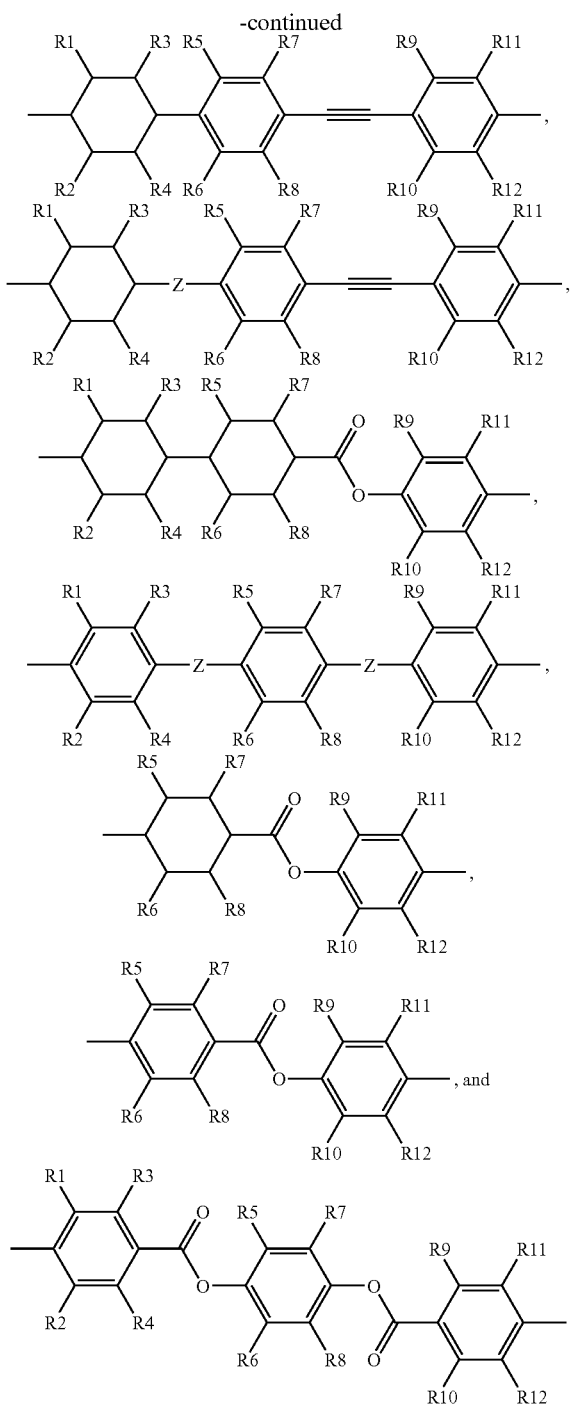

wherein, Z is —COO—, —OCO—, —CH₂CH₂—, —CH=CH—, —C≡C— or a single bond,

R1 through R12 are substituents selected from the group consisting of hydrogen, straight-chain or branched-chain alkyl group having carbon atoms of 1 to 20 (for example, methyl, ethyl, propyl, isopropyl, butyl, t-butyl, pentyl, hexyl, heptyl, octyl, 2-ethylhexyl, dodecyl, hexadecyl, cyclopropyl, cyclopentyl, cyclohexyl, 1-norbornyl, 1-adamantyl), halogen (for example, fluoro, chloro, bromo or iodide), C1-C20 alkoxy group, C1-C20 aliphatic group, C1-C20 aliphatic amino group, C1-C20 aliphatic imino group, C1-C20 aliphatic alkyl imino group, C6-C20 aryl group, C5-C20 heterocyclic group, cyano group, C1-C20 carboxyl group, carbamoyl group, C1-C20 aliphatic oxy carbonyl group, C6-C20 aryl oxy carbonyl group, C1-C20 acyl group, hydroxy group, C1-C20 aliphatic oxy group, C6-C20 aryloxy group, C1-C20 acyloxy group, carbamoyloxy group, C5-C20 heterocyclic oxy group, C1-C20 aliphatic oxy carbonyloxy group, N—C1-C20 alkylacylamino group, carbamoylamino group, sulfamoylamino group, C1-C20 aliphatic oxy carbonylamino group, C6-C20 aryloxycarbonylamino group, C1-C20 aliphatic sulfonylamino group, C5-C20 arylsulfonylamino group, C1-C20 aliphatic thio group, C6-C20 arylthio group, C1-C20 aliphatic sulfonyl group, C6-C20 arylsulfonyl group, sulfamoyl group, sulfo group, and imide group.

The end group R may be selected from the group consisting of H, F, Cl, Br, I, CN, SCN, SF₅H, NO₂, straight-chain or branched-chain alkyl groups having carbon atoms of 1 to 20 (for example, methyl, ethyl, propyl, isopropyl, butyl, t-butyl, pentyl, hexyl, heptyl, octyl, 2-ethylhexyl, dodecyl, hexadecyl, cyclopropyl, cyclopentyl, cyclohexyl, 1-norbornyl and 1-adamantyl), C1-C20 alkoxy group, and C1-C20 aliphatic group.

Also, the curable liquid crystal compounds represented by the following Formulas (1)-(4) disclosed in Korean Patent Laid-open Publication No. 2003-0059268 may be used as the liquid crystal compound. The liquid crystal compounds of the following Formulas may be used alone or in combination thereof. More particularly, a Merck composition in which the compounds of the following Formulas are mixed to vertically orient liquid crystal molecules may be used herein. The curable liquid crystal compound includes, but is not particularly limited to, reactive mesogen (commercially available from Merck), and LC-242 (commercially available from BASF).

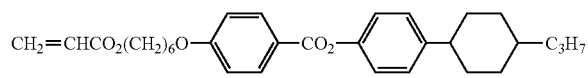
(1)

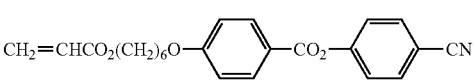
(2)

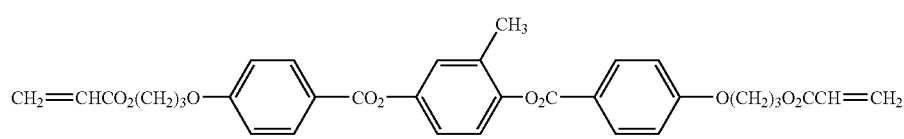
(3)

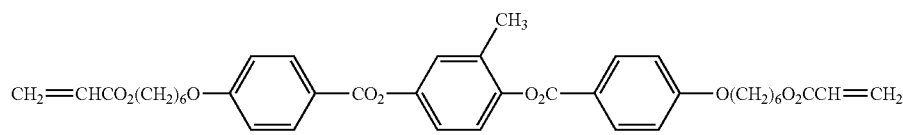

(4)

Orientation (vertical orientation) of the dichroic dye is improved when the curable dichroic dye is mixed with the curable liquid crystal compound (a vertically oriented liquid crystal compound), and therefore the composition of one embodiment of the present invention shows a viewing angle control effect.

The curable dichroic dye used as one component of the composition for forming an optical component according to one embodiment of the present invention has a curable functional group (a photoreactive group or a thermally reactive group) bound to at least one end thereof. Therefore, when the curable dichroic dye is applied onto a base substrate, the curable dichroic dye is rapidly aired by the photoreactive group or a thermally reactive functional groups showing airing property, which leads to the shortened process time, and thus the reduced manufacturing cost. Also, the optical component with excellent thermal stability and durability is formed due to the cross linking shape of the optical component layer.

The curable dichroic dye includes dichroic dyes that absorb all visible light to present a black color. Therefore, the curable dichroic dye may be one of black dyes having excellent a dichroic ratio, or dyes that are mixed to allow red, green and blue dyes to present a black color.

In one embodiment of the present invention, dyes having a rod-shaped molecular structure and comprising a curable functional group bound to the end of each dye molecule may be used as the dichroic dye. The dichroic dye, which may be used in the present invention, includes, but is not particularly limited to, the curable dichroic dyes in which a curable functional group is bound to dichroic dyes as listed in the literature "Dichroic dyes for liquid crystal displays" written by Ivashchenko. The curable dichroic dyes in which a spacer and a curable functional group are bound to at least one end of each of dichroic dyes as disclosed in the Ivashchenko's literature may be used as the curable dichroic dye in the composition for forming an optical component according to one embodiment of the present invention.

Dichroic dye materials that may be used as the dichroic dye having a space and a curable functional group bound to at least one end thereof includes any of dichroic dyes that have been generally known in the art, and specific examples of the dichroic dye materials include, but are not particularly limited to, bisarylidene aminoanthraquinone, 4-methoxybenzylidene-4'-butylaniline, 4-alkylaminoazobenzene, 4-aminoazobenzene, 4-alkylamino-4'-nitroazobenzene, 4-dialkylamino-4'-nitroazobenzene, 2,5-dichloro-4-dimethylamino-4'-nitroazobenzene, 4-dialkylamino-4'-(4-alkylbenzylideneamino)azobenzene, 4-dimethylamino-4'-carboxyarylazobenzene, 4-dialkylamino-2'-methylmethoxy-4'-(4-cyanobenzylideneamino)azobenzene, 4'-(morpholin-1-yl)azobenzene, 4'-(N-methyl-N-hexylamino)azobenzene, 4'-(N-methyl-N-benzylamino)azobenzene, 4-(N-alkylamino)-3',4'-dicyanoazobenzene, 1-amino-4-arylazonaphthalene, 1-dimethylamino-4-arylazonaphthalene, 1-oxy-4-[4-(trans-4-butylcyclohexyl)phenylazo]naphthalene, 1-arylidene-amino-4-(4-arylideneaminophenylazo)naphthalene, 2-[4-(4-cyanophenyl)phenylazo]-1-hydroxynaphthalene, 2-(aminophenylazo)-4-nitrothiazole, 2-arylazo-5-nitrothiazole, 5-[(4-amylpiperazin-1-yl)phenylazo]-2-arylpyrimidine, 2-(4-dialkylaminophenylazo)benzenothiazole, 4-dialkylaminophenylazoheterocycle, 4-arylazo-4'-dimethylaminoazobenzene, 4-arylazo-4'-dialkylaminoazobenzene, 4-arylazo-4'-(N-methyl-N-hexylamino)azobenzene, 4-arylazo-4'-(N-benzyl-N-methylamino)azobenzene, 4,4"-bis-(trans-4-alkylcyclohexylcarboxy)bisazobenzene, 4-arylazo-4'-benzyloxyazobenzene, 4,4"-bis-(hexylbenzoyloxy)bisazobenzene, 4,4"-bis-[4-(trans-4-alkylcyclohexyl)benzoyloxy]-2-methyl-5-isopropylbisazobenzene, 4,4"-bis-(4-octylbiphenyl-4'-carboxy)bisazobenzene, 4,4'-bis(arylazo)-2,3,2',3'-tetrachlorodiphenyl, 1-(4-dimethylaminophenylazo)-4-(4-diphenylazo) naphthalene, 1-arylazo-4-(4-dialkylaminophenylazo)naphthatene, 1-arylazo-4-[4-(pyrrol-1-yl)phenylazo]naphthalene, 1-alkoxy-4-arylazonaphthalene, 1-arylazo-4-(4-butoxyphenylazo)naphthalene, 1-arylazo-4-(4-butoxyphenylazo)naphthalene, 1-(4-arylazophenylazo)naphthalene, 4,4'-bis(4-dimethylaminophenylazo)azobenzene, 4,4'-bis(4-dibenzylaminophenylazo)azobenzene, 1-(4-dialkylaminophenylazo)-4-(4-arylazophenylazo) naphthalene, 1-(4-diacyloxyphenylazo)-4-[(4-acyloxyphenylazo)phenylazo]naphthalene, 1-arylazo-4-[4-(5-alkylthieno[2,3-b]thiazol-2-ylazo)phenylazo] naphthalene, 2-alkyl-1,5-di-(arylthio)anthraquinone, etc. They may be used in the composition of one embodiment of the present invention, alone or in combinations thereof.

The composition according to one embodiment of the present invention may be formed into a solid coating layer due to the presence of the curable functional group bound to at least one end of the dichroic dye, and therefore the durability of the optical component is improved. Examples of the curable functional group bound to at least one end of the dichroic dye includes, but is not particularly limited to,

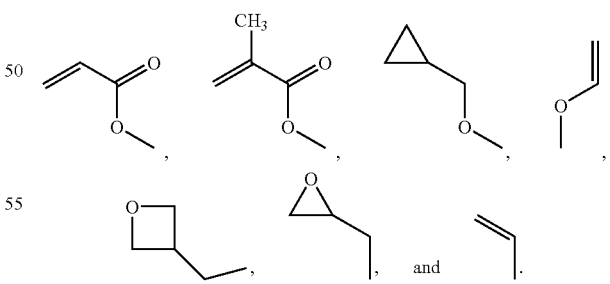

When the curable functional groups are present in both ends of the dichroic dye, the curable functional groups may be identical to or different from each other, and may be each independently selected from the curable functional groups represented by the formulas.

Meanwhile, the curable functional group is bound to an end of the dichroic dye through a linking structure (a spacer). The linking structure may be selected from the group consisting of

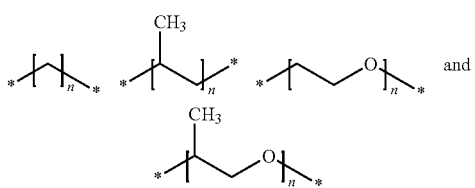

(wherein, n is integer ranging 1 to 12.). The linking strictures used in the same dichroic dyes may be identical to or different from each other.

In addition, in the composition for forming an optical component according to one embodiment of the present invention, curable dichroic dyes having a

R1-L1-[M, L, D]

structural formula comprising a liquid crystalline stricture and a dichroic stricture may be used as the curable dichroic dye. In the structural formula of the dichroic dye, D represents a structure having dichroism (hereinafter, referred to as a 'dichroic structure'), M represents a structure having liquid crystalline properties (hereinafter, referred to as a 'liquid crystalline structure'), R1 represents an end reactive functional group, and L1 and L represent a linking stricture to link R1, M and D to each other. Also, the

[M, L, D]

block comprises one liquid crystalline structure M and 1 to 3 dichroic structures D1, D2 and D3, provided that if the

[M, L, D]

block comprises at least two dichroic structures, the dichroic strictures may be linked to each other, or linked another dichroic structure or the liquid crystalline stricture via a linking stricture L, and M is liked to the adjacent dichroic structures D1, D2 and/or D3 through the linking stricture L, wherein there is no limitation on the linking order of the liquid crystalline structure M and the dichroic structure D, and the dichroic structures D1, D2 and D3 are different from each other.

The curable dichroic dye with the structural formula is a compound in which end reactive functional group R1, liquid crystalline structure M and dichroic structure D are bound (coupled) to each other through a linking structure L, and the use of the curable dichroic dye results in the improvement in the physical properties such as dichroic ratio, vertical orientation, heat resistance and durability in the manufacture of the optical component using the composition comprising the curable dichroic dye for forming an optical component.

The

[M, L, D]

block may comprise one liquid crystalline structure M and 1 to 3 dichroic structures D1, D2 and D3. When the dichroic dye according to one embodiment of the present invention comprises at least two dichroic structures D1, D2 and/or D3, the dichroic strictures may be directly coupled to each other, or coupled to each other through the linking structure L. The liquid crystalline structure M is coupled to the adjacent dichroic strictures D1, D2 and/or D3 through the linking stricture L. In this case, there is no limitation on the linking order of the liquid crystalline structure M and the dichroic structures D1, D2 and D3. Also, the dichroic strictures comprised in the dichroic dye with a single structure are not identical to each other. Also, the dichroic structure D itself may also have its additional liquid crystalline property.

The dichroic dye of one embodiment of the present invention forms a solid coating layer due to the presence of the end reactive functional group R1 through coating and drying processes, which leads to the improved durability of the optical component. The orientation of the optical component is improved due to the liquid crystalline structure M, which leads to the improved dichroism of the optical component. The binding (coupling) of the end reactive functional group R1, the liquid crystalline stricture M and the dichroic structure D through the linking structures L, L1 and the like results in the further improved compatibility of the liquid crystalline structure with the dichroic structure.

The dichroic dye according to one embodiment of the present invention may further comprise a functional terminal group R2 and a linking structure L3 bound to the other end of the

[M, L, D]

block that is free from the end reactive functional group and the linking stricture.

The structure of the dichroic dye further comprising a functional terminal group R2 and a linking stricture L3 may be a structural, formula

R1-L1-[M, L, D]-L3-R2

. The functional terminal group R2 that may be further comprised in the dichroic dye may be a reactive functional group, or a non-reactive functional group.

The dichroic stricture D may be any of structure showing dichroism in the dyes that have been generally used in the art. Examples of the dichroic stricture includes one dye, but is not particularly limited to, selected from the group consisting of azo, anthraquinone, azomethine, indigo, thioindigo, cyanine, indane, azulene, perylene, phthaloperine, azine dyes, etc.

Examples of the azo dyes as the dichroic stricture comprise:

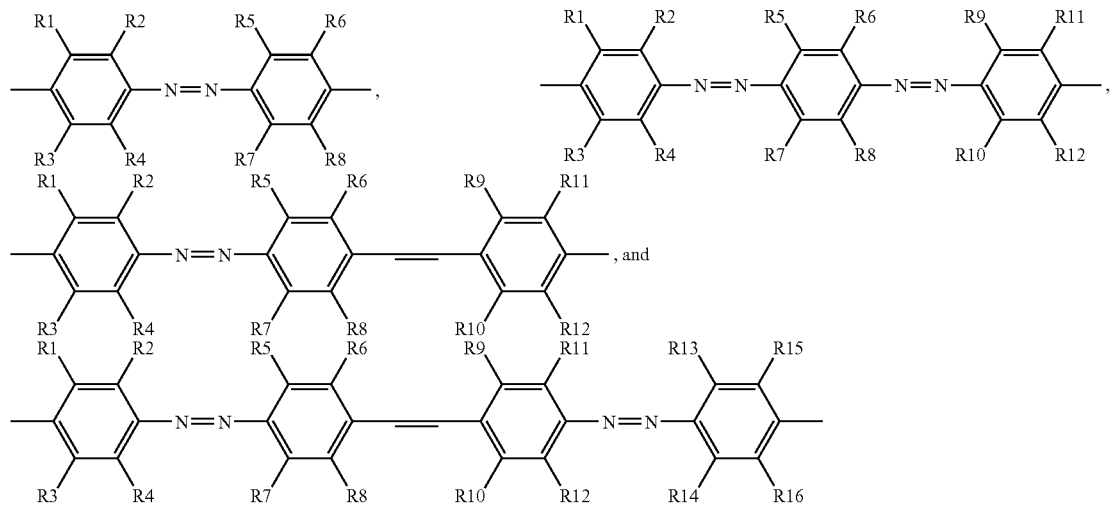
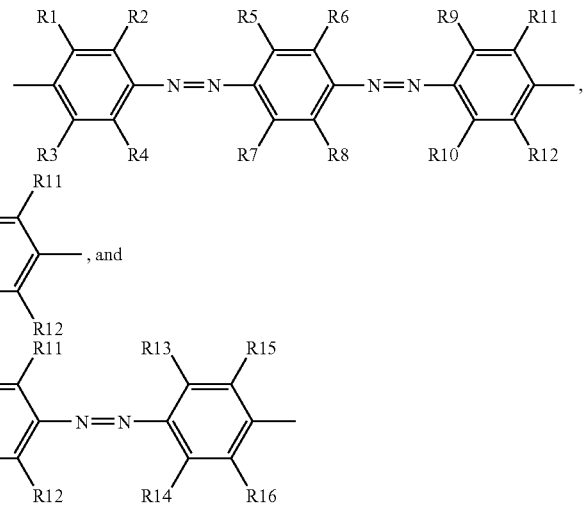

wherein, R1 through R16 are substituents selected from the group consisting of hydrogen, straight-chain or branched-chain alkyl groups having carbon atoms of 1 to 20 (for example, methyl, ethyl, propyl, isopropyl, butyl, t-butyl, pentyl, hexyl, heptyl, octyl, 2-ethylhexyl, dodecyl, hexadecyl, cyclopropyl, cyclopentyl, cyclohexyl, 1-norbornyl and 1-adamantyl), halogen (for example, fluoro, chloro, bromo or iodide), C1-C20 alkoxy group, C1-C20 aliphatic group, C1-C20 aliphatic amino group, C1-C20 aliphatic imino group, C1-C20 aliphatic alkyl imino group, C6-C20 aryl group, C5-C20 heterocyclic group, cyano group, C1-C20 carboxyl group, carbamoyl group, C1-C20 aliphatic oxy carbonyl group, C6-C20 aryl oxy carbonyl group, C1-C20 acyl group, hydroxy group, C1-C20 aliphatic oxy group, C6-C20 aryloxy group, C1-C20 acyloxy group, carbamoyloxy group, C5-C20 heterocyclic oxy group, C1-C20 aliphatic oxy carbonyloxy group, N—C1-C20 alkylacylamino group, carbamoylamino group, sulfamoylamino group, C1-C20 aliphatic oxy carbonylamino group, C6-C20 aryloxycarbonylamino group, C1-C20 aliphatic sulfonylamino group, C5-C20 arylsulfonylamino group, C1-C20 aliphatic thio group, C6-C20 arylthio group, C1-C20 aliphatic sulfonyl group, C6-C20 arylsulfonyl group, sulfamoyl group, sulfo group, and imide group, or R5 and R6 or R7 and R8 may be linked to each other to form a phenyl group.

Examples of the anthraquinone dyes as the dichroic stricture comprise:

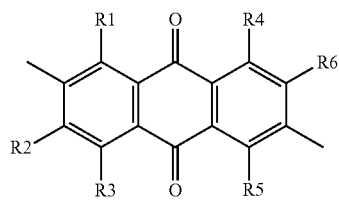

wherein, R1 through R6 are substituents selected from the group consisting of hydrogen, straight-chain or branched-chain alkyl groups having carbon atoms of 1 to 20 (for example, methyl, ethyl, propyl, isopropyl, butyl, t-butyl, pentyl, hexyl, heptyl, octyl, 2-ethylhexyl, dodecyl, hexadecyl, cyclopropyl, cyclopentyl, cyclohexyl, 1-norbornyl and 1-adamantyl), halogen (for example, fluoro, chloro, bromo or iodide), C1-C20 alkoxy group, C1-C20 aliphatic group, C1-C20 aliphatic amino group, C1-C20 aliphatic imino group, C1-C20 aliphatic alkyl imino group, C6-C20 aryl group, C5-C20 heterocyclic group, cyano group, C1-C20 carboxyl group, carbamoyl group, C1-C20 aliphatic oxy carbonyl group, C6-C20 aryl oxy carbonyl group, C1-C20 acyl group, hydroxy group, C1-C20 aliphatic oxy group, C6-C20 aryloxy group, C1-C20 acyloxy group, carbamoyloxy group, C5-C20 heterocyclic oxy group, C1-C20 aliphatic oxy carbonyloxy group, N—C1-C20 alkylacylamino group, carbamoylamino group, sulfamoylamino group, C1-C20 aliphatic oxy carbonylamino group, C6-C20 aryloxycarbonylamino group, C1-C20 aliphatic sulfonylamino group, C5-C20 arylsulfonylamino group, C1-C20 aliphatic thio group, C6-C20 arylthio group, C1-C20 aliphatic sulfonyl group, C6-C20 arylsulfonyl group, sulfamoyl group, sulfo group,

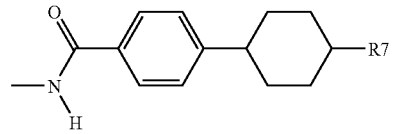

(R7 is defined as in the substituents R1-R6.), and imide group.

Examples of the azomethine dyes as the dichroic stricture comprise:

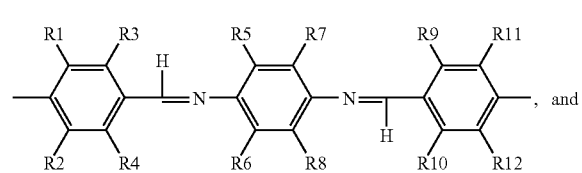

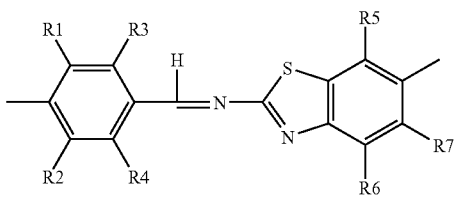

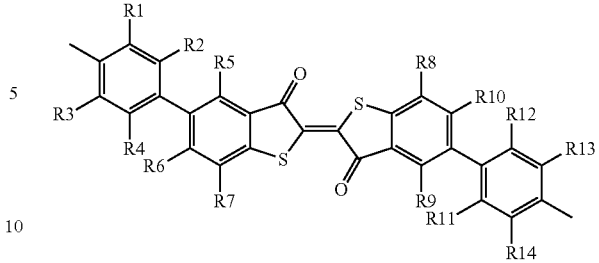

wherein, R1 through R12 are substituents selected from the group consisting of hydrogen, straight-chain or branched-chain alkyl groups having carbon atoms of 1 to 20 (for example, methyl, ethyl, propyl, isopropyl, butyl, t-butyl, pentyl, hexyl, heptyl, octyl, 2-ethylhexyl, dodecyl, hexadecyl, cyclopropyl, cyclopentyl, cyclohexyl, 1-norbornyl and 1-adamantyl), halogen (for example, fluoro, chloro, bromo or iodide), C1-C20 alkoxy group, C1-C20 aliphatic group, C1-C20 aliphatic amino group, C1-C20 aliphatic imino group, C1-C20 aliphatic alkyl imino group, C6-C20 aryl group, C5-C20 heterocyclic group, cyano group, C1-C20 carboxyl group, carbamoyl group, C1-C20 aliphatic oxy carbonyl group, C6-C20 aryl oxy carbonyl group, C1-C20 acyl group, hydroxy group, C1-C20 aliphatic oxy group, C6-C20 aryloxy group, C1-C20 acyloxy group, carbamoyloxy group, C5-C20 heterocyclic oxy group, C1-C20 aliphatic oxy carbonyloxy group, N—C1-C20 alkylacylamino group, carbamoylamino group, sulfamoylamino group, C1-C20 aliphatic oxy carbonylamino group, C6-C20 aryloxycarbonylamino group, C1-C20 aliphatic sulfonylamino group, C5-C20 arylsulfonylamino group, C1-C20 aliphatic thio group, C6-C20 arylthio group, C1-C20 aliphatic sulfonyl group, C6-C20 arylsulfonyl group, sulfamoyl group, sulfo group, and imide group.

Examples of the indigo and thioindigo dyes as the dichroic stricture comprise:

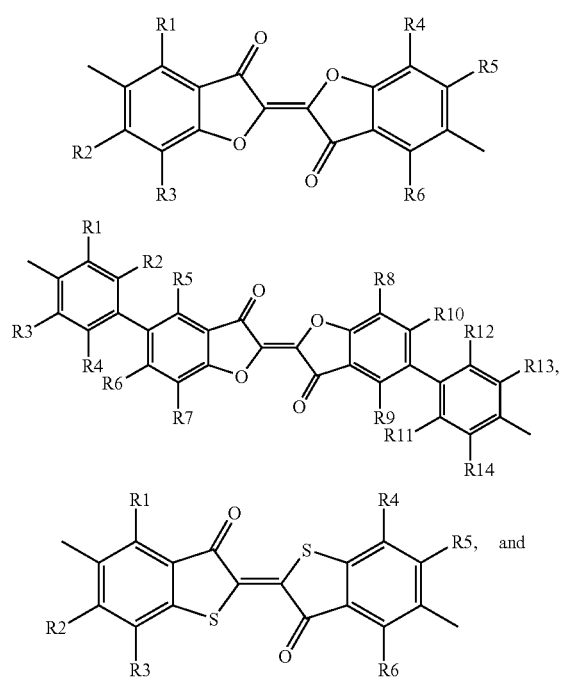

wherein, R1 through R14 are substituents selected from the group consisting of hydrogen, straight-chain or branched-chain alkyl groups having carbon atoms of 1 to 20 (for example, methyl, ethyl, propyl, isopropyl, butyl, t-butyl, pentyl, hexyl, heptyl, octyl, 2-ethylhexyl, dodecyl, hexadecyl, cyclopropyl, cyclopentyl, cyclohexyl, 1-norbornyl and 1-adamantyl), halogen (for example, fluoro, chloro, bromo or iodide), C1-C20 alkoxy group, C1-C20 aliphatic group, C1-C20 aliphatic amino group, C1-C20 aliphatic imino group, C1-C20 aliphatic alkyl imino group, C6-C20 aryl group, C5-C20 heterocyclic group, cyano group, C1-C20 carboxyl group, carbamoyl group, C1-C20 aliphatic oxy carbonyl group, C6-C20 aryl oxy carbonyl group, C1-C20 acyl group, hydroxy group, C1-C20 aliphatic oxy group, C6-C20 aryloxy group, C1-C20 acyloxy group, carbamoyloxy group, C5-C20 heterocyclic oxy group, C1-C20 aliphatic oxy carbonyloxy group, N—C1-C20 alkylacylamino group, carbamoylamino group, sulfamoylamino group, C1-C20 aliphatic oxy carbonylamino group, C6-C20 aryloxycarbonylamino group, C1-C20 aliphatic sulfonylamino group, C5-C20 arylsulfonylamino group, C1-C20 aliphatic thio group, C6-C20 arylthio group, C1-C20 aliphatic sulfonyl group, C6-C20 arylsulfonyl group, sulfamoyl group, sulfo group, and imide group.

Examples of the cyanine dyes as the dichroic stricture comprise:

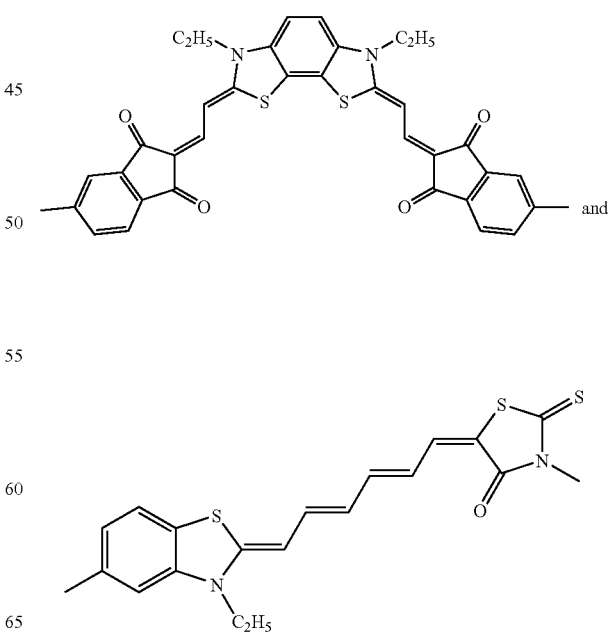

Examples of the indane dyes as the dichroic structure comprise:

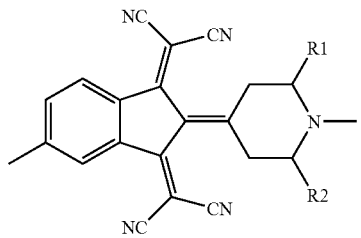

wherein, R1 through R2 are substituents selected from the group consisting of hydrogen, straight-chain or branched-chain alkyl groups having carbon atoms of 1 to 20 (for example, methyl, ethyl, propyl, isopropyl, butyl, t-butyl, pentyl, hexyl, heptyl, octyl, 2-ethylhexyl, dodecyl, hexadecyl, cyclopropyl, cyclopentyl, cyclohexyl, 1-norbornyl and 1-adamantyl), halogen (for example, fluoro, chloro, bromo or iodide), C1-C20 alkoxy group, C1-C20 aliphatic group, C1-C20 aliphatic amino group, C1-C20 aliphatic imino group, C1-C20 aliphatic alkyl imino group, C6-C20 aryl group, C5-C20 heterocyclic group, cyano group, C1-C20 carboxyl group, carbamoyl group, C1-C20 aliphatic oxy carbonyl group, C6-C20 aryl oxy carbonyl group, C1-C20 acyl group, hydroxy group, C1-C20 aliphatic oxy group, C6-C20 aryloxy group, C1-C20 acyloxy group, carbamoyloxy group, C5-C20 heterocyclic oxy group, C1-C20 aliphatic oxy carbonyloxy group, N—C1-C20 alkylacylamino group, carbamoylamino group, sulfamoylamino group, C1-C20 aliphatic oxy carbonylamino group, C6-C20 aryloxycarbonylamino group, C1-C20 aliphatic sulfonylamino group, C5-C20 arylsulfonylamino group, C1-C20 aliphatic thio group, C6-C20 arylthio group, C1-C20 aliphatic sulfonyl group, C6-C20 arylsulfonyl group, sulfamoyl group, sulfo group and imide group.

Examples of the azulene dyes as the dichroic stricture comprise:

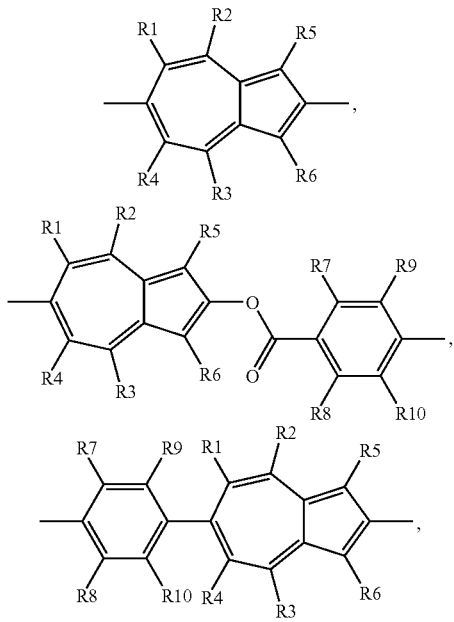

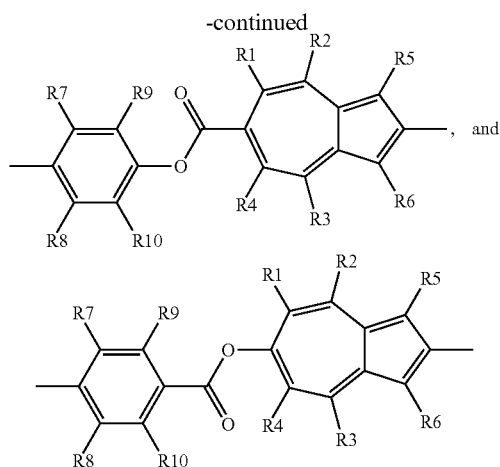

wherein, R1 through R10 are substituents selected from the group consisting of hydrogen, straight-chain or branched-chain alkyl groups having carbon atoms of 1 to 20 (for example, methyl, ethyl, propyl, isopropyl, butyl, t-butyl, pentyl, hexyl, heptyl, octyl, 2-ethylhexyl, dodecyl, hexadecyl, cyclopropyl, cyclopentyl, cyclohexyl, 1-norbornyl and 1-adamantyl), halogen (for example, fluoro, chloro, bromo or iodide), C1-C20 alkoxy group, C1-C20 aliphatic group, C1-C20 aliphatic amino group, C1-C20 aliphatic imino group, C1-C20 aliphatic alkyl imino group, C6-C20 aryl group, C5-C20 heterocyclic group, cyano group, C1-C20 carboxyl group, carbamoyl group, C1-C20 aliphatic oxy carbonyl group, C6-C20 aryl oxy carbonyl group, C1-C20 acyl group, hydroxy group, C1-C20 aliphatic oxy group, C6-C20 aryloxy group, C1-C20 acyloxy group, carbamoyloxy group, C5-C20 heterocyclic oxy group, C1-C20 aliphatic oxy carbonyloxy group, N—C1-C20 alkylacylamino group, carbamoylamino group, sulfamoylamino group, C1-C20 aliphatic oxy carbonylamino group, C6-C20 aryloxycarbonylamino group, C1-C20 aliphatic sulfonylamino group, C5-C20 arylsulfonylamino group, C1-C20 aliphatic thio group, C6-C20 arylthio group, C1-C20 aliphatic sulfonyl group, C6-C20 arylsulfonyl group, sulfamoyl group, sulfo group, and imide group.

Examples of the perylene dyes as the dichroic stricture comprise:

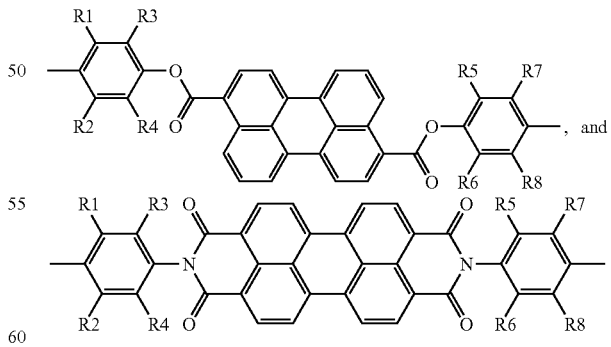

wherein, R1 through R8 are substituents selected from the group consisting of hydrogen, straight-chain or branched-chain alkyl groups having carbon atoms of 1 to 20 (for example, methyl, ethyl, propyl, isopropyl, butyl, t-butyl, pentyl, hexyl, heptyl, octyl, 2-ethylhexyl, dodecyl, hexadecyl, cyclopropyl, cyclopentyl, cyclohexyl, 1-norbornyl and 1-adamantyl), halogen (for example, fluoro, chloro, bromo or iodide), C1-C20 alkoxy group, C1-C20 aliphatic group, C1-C20 aliphatic amino group, C1-C20 aliphatic imino group, C1-C20 aliphatic alkyl imino group, C6-C20 aryl group, C5-C20 heterocyclic group, cyano group, C1-C20 carboxyl group, carbamoyl group, C1-C20 aliphatic oxy carbonyl group, C6-C20 aryl oxy carbonyl group, C1-C20 acyl group, hydroxy group, C1-C20 aliphatic oxy group, C6-C20 aryloxy group, C1-C20 acyloxy group, carbamoyloxy group, C5-C20 heterocyclic oxy group, C1-C20 aliphatic oxy carbonyloxy group, N—C1-C20 alkylacylamino group, carbamoylamino group, sulfamoylamino group, C1-C20 aliphatic oxy carbonylamino group, C6-C20 aryloxycarbonylamino group, C1-C20 aliphatic sulfonylamino group, C5-C20 arylsulfonylamino group, C1-C20 aliphatic thio group, C6-C20 arylthio group, C1-C20 aliphatic sulfonyl group, C6-C20 arylsulfonyl group, sulfamoyl group, sulfo group, and imide group.

Examples of the phthaloperine dyes as the dichroic structure comprise:

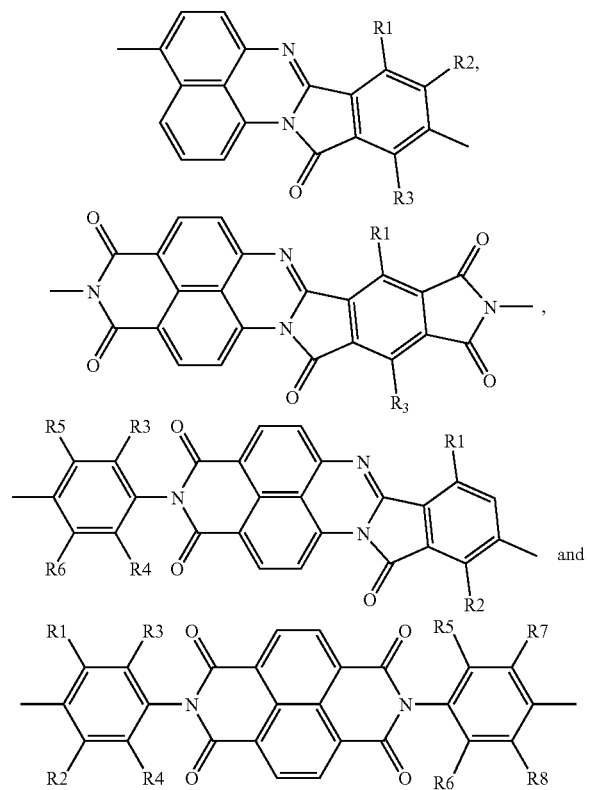

wherein, R1 through R8 are substituents selected from the group consisting of hydrogen, straight-chain or branched-chain alkyl groups having carbon atoms of 1 to 20 (for example, methyl, ethyl, propyl, isopropyl, butyl, t-butyl, pentyl, hexyl, heptyl, octyl, 2-ethylhexyl, dodecyl, hexadecyl, cyclopropyl, cyclopentyl, cyclohexyl, 1-norbornyl and 1-adamantyl), halogen (for example, fluoro, chloro, bromo or iodide), C1-C20 alkoxy group, C1-C20 aliphatic group, C1-C20 aliphatic amino group, C1-C20 aliphatic imino group, C1-C20 aliphatic alkyl imino group, C6-C20 aryl group, C5-C20 heterocyclic group, cyano group, C1-C20 carboxyl group, carbamoyl group, C1-C20 aliphatic oxy carbonyl group, C6-C20 aryl oxy carbonyl group, C1-C20 acyl group, hydroxy group, C1-C20 aliphatic oxy group, C6-C20 aryloxy group, C1-C20 acyloxy group, carbamoyloxy group, C5-C20 heterocyclic oxy group, C1-C20 aliphatic oxy carbonyloxy group, N—C1-C20 alkylacylamino group, carbamoylamino group, sulfamoylamino group, C1-C20 aliphatic oxy carbonylamino group, C6-C20 aryloxycarbonylamino group, C1-C20 aliphatic sulfonylamino group, C5-C20 arylsulfonylamino group, C1-C20 aliphatic thio group, C6-C20 arylthio group, C1-C20 aliphatic sulfonyl group, C6-C20 arylsulfonyl group, sulfamoyl group, sulfo group, and imide group.

Examples of the azine dyes as the dichroic structure comprise:

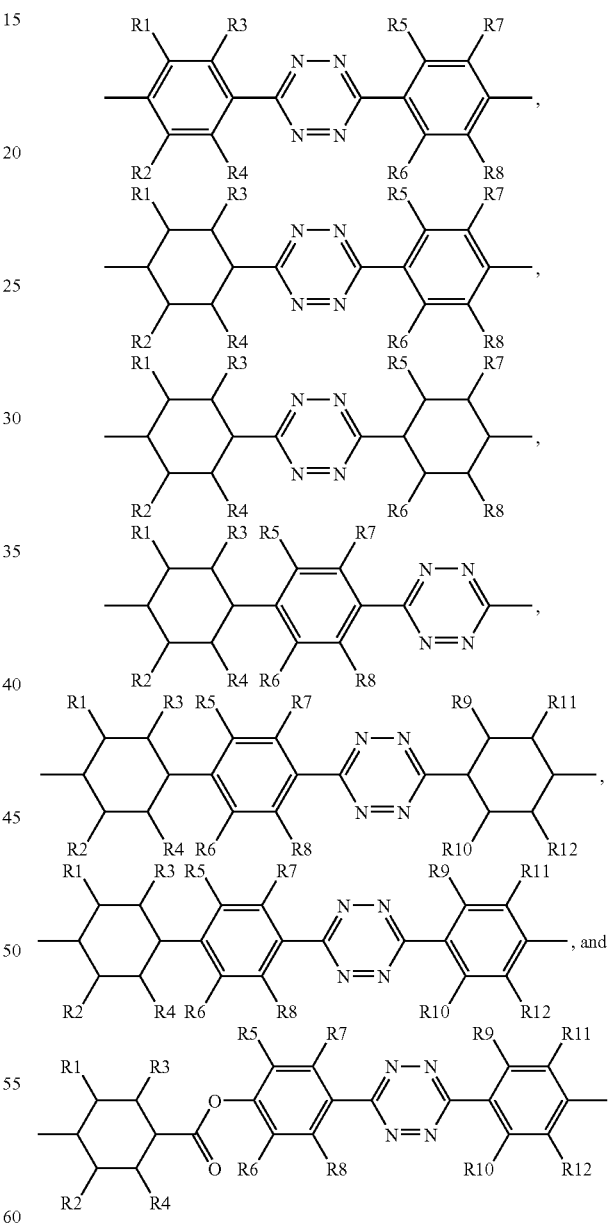

wherein, R1 through R12 are substituents selected from the group consisting of hydrogen, straight-chain or branched-chain alkyl groups having carbon atoms of 1 to 20 (for example, methyl, ethyl, propyl, isopropyl, butyl, t-butyl, pentyl, hexyl, heptyl, octyl, 2-ethylhexyl, dodecyl, hexadecyl, cyclopropyl, cyclopentyl, cyclohexyl, 1-norbornyl and 1-adamantyl), halogen (for example, fluoro, chloro, bromo or iodide), C1-C20 alkoxy group, C1-C20 aliphatic group, C1-C20 aliphatic amino group, C1-C20 aliphatic imino group, C1-C20 aliphatic alkyl imino group, C6-C20 aryl group, C5-C20 heterocyclic group, cyano group, C1-C20 carboxyl group, carbamoyl group, C1-C20 aliphatic oxy carbonyl group, C6-C20 aryl oxy carbonyl group, C1-C20 acyl group, hydroxy group, C1-C20 aliphatic oxy group, C6-C20 aryloxy group, C1-C20 acyloxy group, carbamoyloxy group, C5-C20 heterocyclic oxy group, C1-C20 aliphatic oxy carbonyloxy group, N—C1-C20 alkylacylamino group, carbamoylamino group, sulfamoylamino group, C1-C20 aliphatic oxy carbonylamino group, C6-C20 aryloxycarbonylamino group, C1-C20 aliphatic sulfonylamino group, C5-C20 arylsulfonylamino group, C1-C20 aliphatic thio group, C6-C20 arylthio group, C1-C20 aliphatic sulfonyl group, C6-C20 arylsulfonyl group, sulfamoyl group, sulfo group, and imide group.

The dichroic stricture D itself may have its additional liquid crystalline property. Examples of the dichroic stricture D comprise, but are not particularly limited to, the following formula.

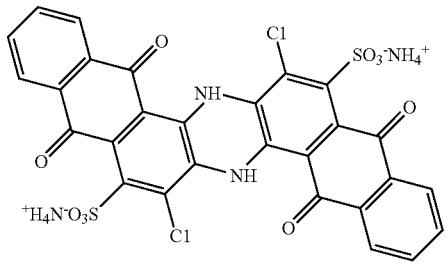

The liquid crystalline stricture M may be any of chemical structures that have been generally known in the art to have liquid crystalline properties. The orientation of the dichroic structure D is improved due to the liquid crystalline structure M.

Examples of the liquid crystalline stricture comprise, but are not particularly limited to, the following compounds:

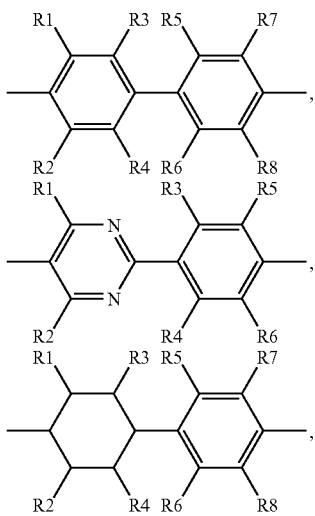

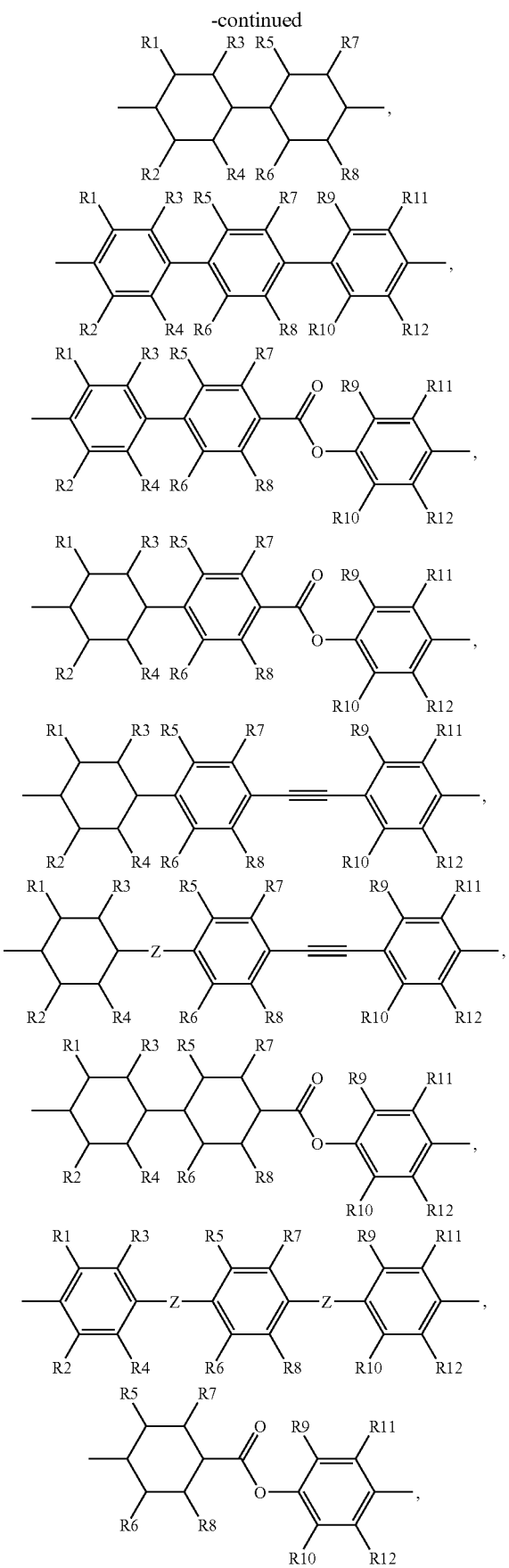

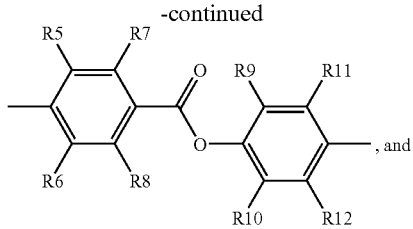

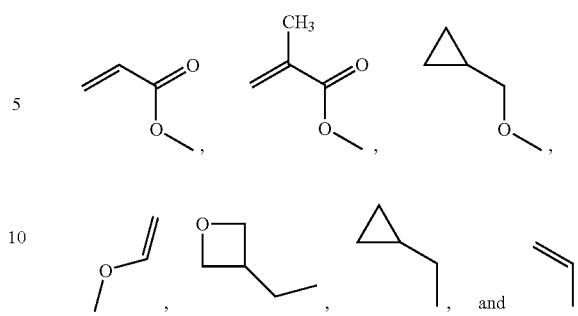

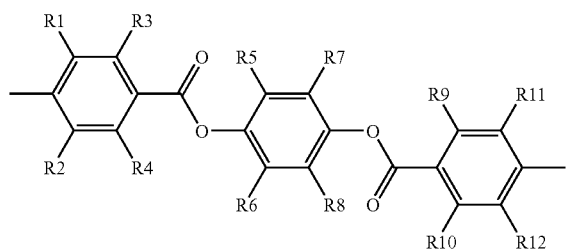

wherein, Z is —COO—, —OCO—, —CH2CH2—, —CH=CH—, —C≡C— or single bond,

R1 through R12 are substituents selected from the group consisting of hydrogen, straight-chain or branched-chain alkyl groups having carbon atoms of 1 to 20 (for example, methyl, ethyl, propyl, isopropyl, butyl, t-butyl, pentyl, hexyl, heptyl, octyl, 2-ethylhexyl, dodecyl, hexadecyl, cyclopropyl, cyclopentyl, cyclohexyl, 1-norbornyl, 1-adamantyl), halogen (for example, fluoro, chloro, bromo or iodide), C1-C20 alkoxy group, C1-C20 aliphatic group, C1-C20 aliphatic amino group, C1-C20 aliphatic imino group, C1-C20 aliphatic alkyl imino group, C6-C20 aryl group, C5-C20 heterocyclic group, cyano group, C1-C20 carboxyl group, carbamoyl group, C1-C20 aliphatic oxy carbonyl group, C6-C20 aryl oxy carbonyl group, C1-C20 acyl group, hydroxy group, C1-C20 aliphatic oxy group, C6-C20 aryloxy group, C1-C20 acyloxy group, carbamoyloxy group, C5-C20 heterocyclic oxy group, C1-C20 aliphatic oxy carbonyloxy group, N—C1-C20 alkylacylamino group, carbamoylamino group, sulfamoylamino group, C1-C20 aliphatic oxy carbonylamino group, C6-C20 aryloxycarbonylamino group, C1-C20 aliphatic sulfonylamino group, C5-C20 arylsulfonylamino group, C1-C20 aliphatic thio group, C6-C20 arylthio group, C1-C20 aliphatic sulfonyl group, C6-C20 arylsulfonyl group, sulfamoyl group, sulfo group and imide group.

The dichroic dye used as one component in the optical component layer according to one embodiment of the present invention has an end reactive functional group R1 bound to one end of the dichroic dye to form a solid coating layer, which leads to the enhanced durability of the optical component. Also, the dichroic dye may further comprise a functional terminal group R2, when necessary. When the dichroic dye comprises the functional terminal group R2, the functional terminal groups R1 and R2 may be identical to, or different from each other. Here, the functional terminal group R2 may be a reactive functional group or a non-reactive functional group that has been generally known in the art.

Examples of the reactive functional groups R1 and R2 may be selected from the group consisting of, but is not particularly limited to, The non-reactive functional group R2 may be selected from the group consisting of, but is not particularly limited to, C1-C20 alkyl, C1-C20 alkoxy and cyclohexyl group.

The dichroic stricture D, the liquid crystalline stricture M and the functional terminal groups R1 and R2 are bound (coupled) to each other through the linking structures L1, L, L3, etc. The use of the L1, L and L3 linking structures are possible when they may be used to couple the dichroic structure D, the liquid crystalline stricture M and the functional terminal groups R1 and R2, and may also be identical to or different from each other.

Also, when at least two dichroic structures D1, D2 and D3 are coupled to one dichroic dye structure, the dichroic structures may be directly coupled to each other, or coupled to adjacent dichroic structures or liquid crystalline structures through the linking stricture D.

The linking structure may be selected from the group consisting of

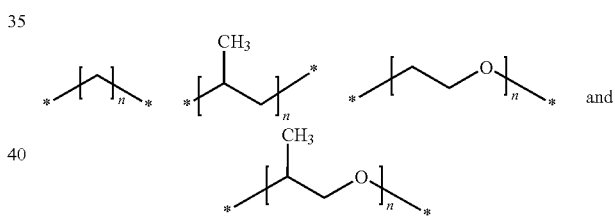

(wherein, n is integer ranging from 1 to 12.), and the linking structure used in one dichroic dye structure may be identical to or different from each other.

Some examples of dichroic dye strictures are listed for the better understanding of the dichroic dye structure used in the composition for forming an optical component according to one embodiment of the present invention, as follows. However, examples of the dichroic dye structure used in one embodiment of the present invention include, but is not particularly limited to, R1-L1-M-L2-D1, R1-L1-M-L2-D1-L3-R2, R1-L1-M-L2-D1-D2-L3-R2, R1-L1-M-L2-D1-L4-D2-L3-R2, R1-L1-D1-L2-M-L4-D2-L5-D3-L3-R2, R1-L1-D2-L2-D1-L4-M-L5-D3-L3-R2, R1-L1-D3-L2-D1-L4-D2-L5-M-L3-R2, R1-L1-D1-D2-L2-M-L4-D3-L3-R2, R1-L1-D1-D2-D3-L2-M, R1-L1-D1-D2-D3-L2-M-L3-R2, R1-L1-D1-D2-L2-M-L4-D3-L3-R2, R1-L1-M-L2-D2-L3-R2, R1-L1-D3-L2-M-L3-R2, R1-L1-D3-D1-L2-M-L3-R2, and R1-L1-D3-L2-M (wherein, M represents a liquid crystalline structure as defined above, D1, D2 and D3 represent dichroic structures, respectively, provided that the dichroic strictures used in one dichroic dye structure are not identical to each other, L1, L2, L3, L4 and L5 represent the linking strictures as defined above, and may be identical to or different from each other, and R1 and R2 represent the functional terminal group as defined above, and may be identical to or different from each other.).

The dichroic dyes of the structural formulas may be prepared, for example, using methods as described later, but the present invention is not particularly limited thereto.

The dichroic strictures D constituting the dichroic dyes of the structural formulas may be prepared, using the methods generally known in the art, for example the method disclosed in the literature 'Organic Chemistry in Colour' (published in 1987 by Springer-Verlag) or 'Dichroic Dyes for Liquid Crystal Displays' (published in 1994 by CRC Press), by synthesizing a dichroic dye (azo, anthraquinone, azomethine, indigo, thioindigo, cyanine, indane, azulene, perylene, phthaloperin, or azine dyes) having hydroxy group or amine group and chemically coupling the synthesized dichroic dye to another structure constituting a dichroic dye.

Meanwhile, —OH group is introduced into an end of the liquid crystalline stricture M constituting the dichroic dye with the above-mentioned structure, and a halogen-substituted alkane (for example, dibromo alkane or dichloro alkane) or alkanedioic acid is synthesized by introducing halogen group into both ends of a linking structure L. Then, the linking structure with the halogen ends or the alkanedioic acid linking structure is coupled to an OH end of the liquid crystalline structure through ether linkage or ester linkage. The coupling of the liquid crystalline stricture and the linking structure is carried out using a conventional alkylation or esterfication.

Also, the dichroic dye having hydroxy group or amine group and the liquid crystalline stricture coupled to the linking structure are chemically coupled to each other using ether linkage or ester linkage (amide linkage if it is amine). In addition, the functional terminal group is also coupled, for example, to the linking stricture having an OH group bound to an end thereof, the linking structure having a halogen end, or the linking stricture having an alkanedioic acid structure bound to an end thereof through the ether linkage or ester linkage (amide linkage if it is amine). As described above, the functional terminal group and the linking stricture are also chemically coupled to each other using the alkylation or esterfication that has been generally known in the art, and the functional terminal group may be treated to have an end that is required for the chemical reactions such as alkylation, esterfication and the like before chemically coupling the functional terminal group to the linking stricture. The functional terminal group to which the linking stricture is coupled is coupled to a functional terminal group and a dichroic stricture or a liquid crystalline structure via the linking strictures.

As described above, the dichroic stricture D, the liquid crystalline structure M, the linking structures L1, L2 and L3, the functional terminal groups R1 and R2 and the like may be coupled through one of the chemical reactions generally known in the art, when necessary, so as to prepare a dichroic dye having a R1-L1-[M, L, D]   or   R1-L1-[M, L, D]-L3-R2 structure. The chemical reactions suitable to chemically couple the respective structures, the functional groups required in each of the components to perform these chemical reactions, and the like are generally known in the art, and they may be suitably selected and adjusted to synthesis a dichroic dye according to one embodiment of the present invention, as apparent to those skilled in the art.

When the dichroic dye is used together with the vertically oriented curable liquid crystal compound, the dichroic dye is vertically oriented, thus to show a viewing angle control characteristic. Also, the dichroic dye has a curable functional group. Therefore, since the dichroic dye is rapidly cured when a base substrate is coated with the dichroic dye, the process time is shortened, and thus the manufacturing cost may also be reduced. Also, the optical component having excellent thermal stability and durability is formed due to the cross linking shape of the optical component layer.

The curable dichroic dye used in the present invention may be a mixture of dyes having red, green and blue colors as separate structures. Also, the curable dichroic dye may be a dichroic structure having moieties presenting red, green and blue colors. In addition, the curable dichroic dye may be a stricture, all of which absorbs all visible light to have a black color. The colors of the curable dichroic dye may be determined according to the dichroic structure in the dichroic dye. The optical component made of the curable dichroic dye or the mixture of curable dichroic dyes absorbs all wavelengths of visible light to use the control of viewing angle.

Also, the composition for forming an optical component may further comprise dichroic dyes having other colors except for the red, green and blue colors as the dichroic dye so as to correct the colors. The dichroic dyes for color correction may also be separate curable dichroic dyes, or may be a dye structure, which has moieties representing colors except for the red, green and blue colors to correct the colors in addition to the single curable dichroic dye stricture. The colors of the dichroic dyes for color correction may also be determined according to the dichroic structure in the dichroic dye. The dichroic dyes for color correction may be mixed in any mixing ratio according to the absorption wavelengths of the dichroic dyes, but there is no particular limitation on the mixing ratio.

Curable dichroic dyes used in the composition for forming an optical component according to one embodiment of the present invention may also be used as the dichroic dyes for color correction. In this case, the dichroic dyes for color correction have different colors since they have different absorption wavelengths.

Other additives may be mixed in the composition for forming an optical component, when necessary. The additives are optionally added, and therefore there is no particular limitation on the lower limit value of the added additives, but the additives may be mixed in a content of 5 or less parts by weight in the composition. However, when the content of the additives is less than 0.15 parts by weight, the desired improvement of coating performance by the addition of the additives may be achieved insufficiently, whereas the adhesion of a coating layer and a base substrate is poor when the content of the additives exceeds 5 parts by weight.

Examples of the other additives include, but are not particularly limited to, a catalyst, a sensitizer, a stabilizing agent, a chain transfer agent, a suppressant, an accelerator, a surface active component, a lubricant, a wetting agent, a dispersing agent, a hydrophobic agent, an adhesive, a flow improver, an antifoaming agent, a thinning agent, a coloring agent, a dye or a pigment, etc., all of which are generally known in the art, and may be suitably selected and used in combinations thereof, when necessary.

The composition for forming an optical component may further comprise 1-10 parts by weight, and preferably 2-7 parts by weight of a airing agent, when necessary. That is, when the composition for forming an optical component is applied onto a base substrate and cured using a laser beam, an additional curing agent does not need to be mixed in the composition for forming an optical component. However, when the composition for forming an optical component is optically or thermally cured after coating the base substrate with the composition, an additional curing agent should been mixed in the composition for forming an optical component.

Examples of the curing agent, which is used when the composition is photopolymerized (photocured) using a UV photocuring process, includes, but are not particularly limited to, photoinitiators such as a at least one active halogen compound selected from the group consisting of a halomethyloxadiazole compound and a halomethyl-s-triazine compound; and 3-aryl-substituted coumarin compound, a benzophenone compound, an acetophenone compound and derivatives thereof, a cyclopentadiene-benzene-iron complex and salts thereof, an oxime compound, etc. In the case of the thermal curing process, the curing agent used in the present invention may include, but is not particularly limited to, thermal airing agents such as an azoisobutyronitrile airing agent, etc. There is no particular limitation on specific materials in the curing agent, but the materials in the curing agent generally known in the art may be used herein.

Examples of the active halogen compounds that is the halomethyloxadiazole compound include 2-halomethyl-5-vinyl-1,3,4-oxadiazole, 2-trichloromethyl-5-styryl-1,3,4-oxadiazole, 2-trichloromethyl-5-(p-cyanostyryl)-1,3,4-oxadiazole, 2-trichloromethyl-5-(p-methoxystyryl)-1,3,4-oxadiazole compounds, etc.

Examples of the active halogen compounds that is the halomethyl-s-triazine compound include vinyl-halomethyl-s-triazine, 2-(naphto-1-yl)-4,6-bis-halomethyl-s-triazine, 4-(p-aminophenyl)-2,6-di-halomethyl-s-triazine compounds, etc.

More specific examples of the halomethyl-s-triazine compounds include, but art not particularly limited to, 2,4-bis(trichloromethyl)-6-p-methoxystyryl-s-triazine, 2,6-bis(trichloromethyl)-4-(3,4-methylenedioxyphenyl)-1,3,5-triazine, 2,6-bis(trichloromethyl)-4-(4-methoxyphenyl)-1,3,5-triazine, 2,4-bis(trichloromethyl)-6-(1-p-dimethylaminophenyl-1,3-butadieny)-s-triazine, 2-trichloromethyl-4-amino-6-p-methoxystyryl-s-triazine, 2-(naphto-1-yl)-4,6-bis-trichloromethyl-s-triazine, 2-(4-methoxy-naphto-1-yl)-4,6-bis-trichloromethyl-s-triazine, 2-(4-ethoxy-naphto-1-yl)-4,6-bis-trichloromethyl-s-triazine, 2-(4-butoxy-naphto-1-yl)-4,6-bis-trichloromethyl-s-triazine, 2-[4-(2-methoxyethyl)-naphto-1-yl]-4,6-bis-trichloromethyl-s-triazine, 2-[4-(2-ethoxyethyl)-naphto-1-yl]-4,6-bis-trichloromethyl-s-triazine, 2-[4-(2-butoxyethyl)-naphto-1-yl]-4,6-bis-trichloromethyl-s-triazine, 2-(2-methoxy-naphto-1-yl)-4,6-bis-trichloromethyl-s-triazine, 2-(6-methoxy-5-methyl-naphto-2-yl)-4,6-bis-trichloromethyl-s-triazine, 2-(6-methoxy-naphto-2-yl)-4,6-bis-trichloromethyl-s-triazine, 2-(5-methoxy-naphto-1-yl)-4,6-bis-trichloromethyl-s-triazine, 2-(4,7-dimethoxy-naphto-1-yl)-4,6-bis-trichloromethyl-s-triazine, 2-(6-ethoxy-naphto-2-yl)-4,6-bis-trichloromethyl-s-triazine, 2-(4,5-dimethoxy-naphto-1-yl)-4,6-bis-trichloromethyl-s-triazine, 4-[p-N,N-di(ethoxycarbonylmethyl)aminophenyl]-2,6-di(trichloromethyl)-s-triazine, 4-[o-methyl-p-N,N-di(ethoxycarbonylmethyl)aminophenyl]-2,6-di(trichloromethyl)-s-triazine, 4-[p-N,N-di(chloromethyl)aminophenyl]-2,6-di(trichloromethyl)-s-triazine, 4-[o-methyl-p-N,N-di(chloroethyl)aminophenyl]-2,6-di(trichloromethyl)-s-triazine, 4-(p-N-chloroethylaminophenyl)-2,6-di(trichloromethyl)-s-triazine, 4-(p-N-ethoxycarbonylmethylaminophenyl)-2,6-di(trichloromethyl)-s-triazine, 4-[p-N,N-di(phenyl)aminophenyl]-2,6-di(trichloromethyl)-s-triazine, 4-(p-N-chloroethylcarbonylaminophenyl)-2,6-di(trichloromethyl)-s-triazine, 4-[p-N-(p-methoxyphenyl)carbonylaminophenyl]-2,6-di(trichloromethyl)-s-triazine 4-[m-N,N-di(ethoxycarbonylmethyl)aminophenyl]-2,6-di(trichloromethyl)-s-triazine, 4-[m-bromo-p-N,N-di(ethoxycarbonylmethyl)aminophenyl]-2,6-di(trichloromethyl)-s-triazine, 4-[m-chloro-p-N,N-di(ethoxycarbonylmethyl)aminophenyl]-2,6-di(trichloromethyl)-s-triazine, 4-[m-fluoro-p-N,N-di(ethoxycarbonylmethyl)aminophenyl]-2,6-di(trichloromethyl)-s-triazine, 4-[o-bromo-p-N,N-(ethoxycarbonylmethyl)aminophenyl]-2,6-di(trichloromethyl)-s-triazine, 4-[o-chloro-p-N,N-(ethoxycarbonylmethyl)aminophenyl]-2,6-di(trichloromethyl)-s-triazine, 4-[o-fluoro-p-N,N-di(ethoxycarbonylmethyl)aminophenyl]-2,6-di(trichloromethyl)-s-triazine, 4-[o-bromo-p-N,N-di(chloroethyl)aminophenyl]-2,6-di(trichloromethyl)-s-triazine, 4-[o-chloro-p-N,N-di(chloroethyl)aminophenyl]-2,6-di(trichloromethyl)-s-triazine, 4-[o-fluoro-p-N,N-di(chloroethyl)aminophenyl]-2,6-di(trichloromethyl)-s-triazine, 4-[m-bromo-p-N,N-di(chloroethyl)aminophenyl]-2,6-di(trichloromethyl)-s-triazine, 4-[m-chloro-p-N,N-di(chloroethyl)aminophenyl]-2,6-di(trichloromethyl)-s-triazine, 4-[m-fluoro-p-N,N-di(chloroethyl)aminophenyl]-2,6-di(trichloromethyl)-s-triazine, 4-(m-bromo-p-N-ethoxycarbonylmethylaminophenyl)-2,6-di(trichloromethyl)-s-triazine, 4-(m-chloro-p-N-ethoxycarbonylmethylaminophenyl)-2,6-di(trichloromethyl)-s-triazine, 4-(m-fluoro-p-N-ethoxycarbonylmethylaminophenyl)-2,6-di(trichloromethyl)-s-triazine, 4-(o-bromo-p-N-ethoxycarbonylmethylaminophenyl)-2,6-di(trichloromethyl)-s-triazine, 4-(o-chloro-p-N-ethoxycarbonylmethylaminophenyl)-2,6-di(trichloromethyl)-s-triazine, 4-(o-fluoro-p-N-ethoxycarbonylmethylaminophenyl)-2,6-di(dichloromethyl)-s-triazine, 4-(m-bromo-p-N-chloroethylaminophenyl)-2,6-di(trichloromethyl)-s-triazine, 4-(m-chloro-p-N-chloroethylaminophenyl)-2,6-di(trichloromethyl)-s-triazine, 4-(m-fluoro-p-N-chloroethylaminophenyl)-2,6-di(trichloromethyl)-s-triazine, 4-(o-bromo-p-N-chloroethylaminophenyl)-2,6-di(trichloromethyl)-s-triazine, 4-(o-chloro-p-N-chloroethylaminophenyl)-2,6-di(trichloromethyl)-s-triazine, 4-(o-fluoro-p-N-chloroethylaminophenyl)-2,6-di(trichloromethyl)-s-triazine, etc. In addition to the halomethyl-s-triazine compound, the photopolymerization initiator (curing agent) includes, but is not particularly limited to, Irgacure series (CIBA Specialty Chemicals, for example Irgacure 651, Irgacure 184, Irgacure 500, Irgacure 1000, Irgacure 149, Irgacure 819, Irgacure 261), Darocur series (for example, Darocur1173), 4,4'-bis(diethylamino)-benzophenone, 2-(O-benzoyloxime)-1-[4-(phenylthio)phenyl]-1,2-octanedione, 1-(O-acetyl oxime)-1-[9-ethyl-6-(2-methylbenzoyl)-9H-carbazol-3-yl]ethanone, 2-benzyl-2-dimethylamino-4-morpholinobutyrophenone, 2,2-dimethoxy-2-phenylacetophenone, 2-(o-chlorophenyl)-4,5-diphenylimidazolyl dimer, 2-(o-fluorophenyl)-4,5-diphenylimidazolyl dimer, 2-(o-methoxyphenyl)-4,5-diphenylimidazolyl dimer, 2-(p-methoxyphenyl)-4,5-diphenylimidazolyl dimer, 2-(p-dimethoxyphenyl)-4,5-diphenylimidazolyl dimer, 2-(2,4-dimethoxyphenyl)-4,5-diphenylimidazolyl dimer, 2-(p-methylmercaptophenyl)-4,5-diphenylimidazolyl dimer, benzoinisopropylether, etc. The curing agents may be used alone or in combinations thereof.

When the content of the airing agent is less than 1 part by weight, the degree of cure of the optical component are deteriorated, whereas the hardness of the cured film is poor when the content of the curing agent exceeds 10 parts by weight.

In addition, another embodiment of the present invention provides an optical component that is formed of the composition for forming an optical component according to one embodiment of the present invention and comprises an optical component layer in which a curable liquid crystal compound and a curable dichroic dye are vertically oriented. The optical component may be prepared by applying (coating) the composition for forming an optical component according to one embodiment of the present invention onto a base substrate and airing the coated composition to form an optical component layer.

A glass plate or a plastic base substrate may be used as the base substrate. The plastic base substrate used herein includes, but is not particularly limited to, acrylic resin, polycarbonate resin, epoxy resin, polyester resin, or the like.

In the manufacture of the optical component, the vertical orientation of the dichroic dye may be endowed by at least one selected from the group consisting of (1) a curable liquid crystal compound comprised in the composition for forming an optical component according to one embodiment of the present invention, (2) an additive (hereinafter, referred to as 'vertically oriented additive') added to the composition for forming an optical component according to one embodiment of the present invention so that the dichroic dye can be vertically oriented, (3) an orientation given to the base substrate itself, and (4) a separate alignment layer formed on the base substrate. The vertical orientation of the dichroic dye in the optical component layer is more important when the optical component of one embodiment of the present invention is used for LCD, etc.

When the dichroic dye is endowed with the vertical orientation using the methods (1) and (2), the optical component may be prepared by coating a base substrate with the composition for forming an optical component according to one embodiment of the present invention or the composition comprising a vertically oriented additive to form an optical component and airing the coated composition.

As the vertically oriented additive, fluorinated carbon surfactants, for example Navec FC4430™ and Navec FC4432™ (commercially available from 3M, U.S.), Zonyl® (commercially available from Dupont, U.S.), and the like may be used. There is no particular limitation on the content of the vertically oriented additive, but the vertically oriented additive may be mixed in contents sufficient to show the vertical orientation, as generally known in the art.

When the dichroic dye is endowed with the vertical orientation using the method (3), the optical component may be prepared by endowing a base substrate with an orientation, coating the oriented base substrate with the composition for forming an optical component according to one embodiment of the present invention and curing the coated composition. In this case, the endowment of the base substrate with the orientation may be performed using any of the methods that are generally known as method for facilitating the vertical orientation of the base substrate, for example, a method for etching a surface of a base substrate coated with a surfactant or a surface of a glass base substrate, etc. Lecithin and the like may be used as the surfactant.

When the dichroic dye is endowed with the vertical orientation using the methods (1) and (3), the optical component may be prepared into an optical component composed of a base substrate 1 and an optical component layer 3, as shown in FIG. 1.

Figure 2:
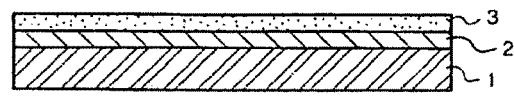
FIG. 2 is a side cross-sectional view illustrating an optical component comprising a base substrate, an alignment layer formed on the base substrate and an optical component layer formed on the alignment layer according to another embodiment of the present invention.

When the dichroic dye is endowed with the vertical orientation using the method (4), the optical component may be prepared by forming a separate alignment layer on a base substrate, coating the formed alignment layer with the composition for forming an optical component according to one embodiment of the present invention, and curing the coated composition. The alignment layer may be formed in any of methods generally known in the art, but the present invention is not particularly limited thereto. Therefore, the alignment layer may be formed, for example, by surface-treating a base substrate with polyimide that facilitates the vertical orientation of the dichroic dye to form a thin film and endowing molecule in the thin film with directionality. The optical component prepared by forming a separate alignment layer as described above is prepared into an optical component comprising a base substrate 1, an oriented alignment layer 2 formed on the base substrate 1, and an optical component layer 3 formed on the alignment layer 2, as shown in FIG. 2.

In the manufacture of the optical component according to one embodiment of the present invention, the composition for forming an optical component is applied onto the base substrate 1 or the alignment layer 2 using any of the method for coating a thin film that are generally used in the art, for example, emissivity coating, blade coating, cast coating, roll coating or the like, but the present invention is not particularly limited thereto. The composition for forming an optical component is preferably coated so that the thickness of the finally aired optical component layer can be in a range from 0.1 to 10 micrometers, and preferably from 0.3 to 7 micrometers. When the thickness of the optical component layer is less than 0.1 micrometers, the optical component layer does not completely cut off visible light, whereas the degree of vertical orientation may be low due to the poor orientation of the composition when the thickness of the optical component layer exceeds 10 micrometers.

The curing may be performed using an electron-beam airing, thermal curing or UV curing method, but the present invention is not particularly limited thereto. As described above, the electron-beam curing method does not need the use of an additional curing agent, but a curing agent should be mixed in the composition for forming an optical component in the case of the thermal curing or UV airing method, as described above.

In addition, a surface of the optical component layer may be further treated using at least one treatment method selected from the group consisting of antistatic treatment, corona treatment, hard coating treatment, antireflection treatment and antiglare treatment, when necessary.

Figure 3:
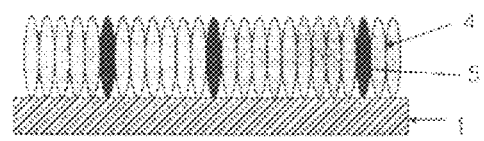
FIG. 3 is a side cross-sectional view illustrating an optical component showing orientation in a molecular level of vertically oriented curable dichroic dye and curable liquid crystal according to one embodiment of the present invention.

The optical component comprising an optical component layer 3 in which a curable liquid crystal compound 4 and a curable dichroic dye 5 are vertically oriented, as prepared using the method according to one embodiment of the present invention, has excellent physical properties such as dichroic ratio, heat resistance and durability, as well as the viewing angle control function (more particularly, narrow viewing angle performance), as shown in FIG. 3. The durability under the conditions of high temperature and high moisture is owing to the cross linking shape of the optical component layer.

The optical component of one embodiment of the present invention may be used as the optical component for controlling a narrow viewing angle since the inventive optical component has the viewing angle control function due to the presence of the vertically oriented liquid crystal compound and dichroic dye, and also used as the optical component for improving the visibility since the inventive optical component has an effect to control external light.

MODE FOR THE INVENTION

Hereinafter, exemplary embodiments of the present invention will be described in more detail. It is considered that the description proposed herein is just an exemplary example for the purpose of illustrations only, not intended to limit the scope of the invention, so it should be understood that other equivalents and modifications could be made thereto without departing from the spirit and scope of the invention.

Synthetic Example 1

(1) Synthesis of 4-(6-bromo hexyloxy)phenyl 4-{[6-(acryloyloxy)hexyl]oxy}benzoate (Compound of Formula (5))

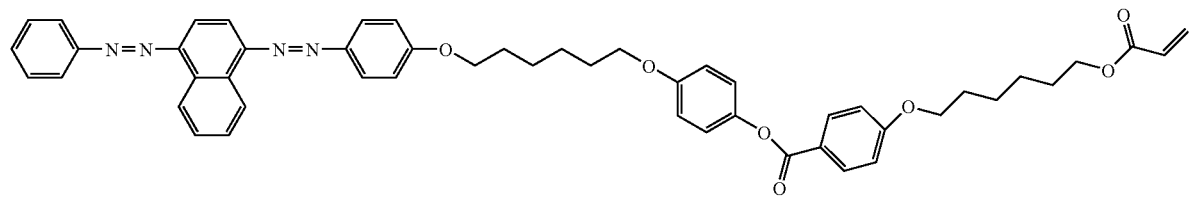

As shown in the following Scheme, hydroquinone (1) (4.5 g (grams)) and 1,6-dibromo hexane (2) (10 g (grams)) were dissolved in methanol (100 ml (milliliters)) at a room temperature. Potassium hydroxide (2.3 g (grams)) was added to the resulting mixture solution, and then fluxed at 60° C. (Celsius) overnight. Next day, the temperature of the reaction mixture is lowered to a room temperature, and methanol was evaporated from the reaction mixture. Then, the reaction mixture was extracted three times with water (100 ml (milliliters)) and ethyl acetate (100 ml (milliliters)). Water was removed over magnesium sulfate, and the solvents were evaporated, and the resulting reaction mixture was purified using a column chromatography (developer solution: ethylacetate/hexane=1/5 volume ratio) to obtain 4.4 g (grams) of 4-(6-bromohexyloxy)phenol (3).

4-{[6-(acryloyloxy)hexyl]oxy}benzoic acid (4) (2.8 g (grams)) was dissolved in tetrahydrofurane (THF, 100 ml (milliliters)) at a room temperature, and a temperature of the resulting mixture was adjusted to a temperature of 0° C. (Celsius). Then, thionyl chloride (12 ml (milliliters), 1M in THF) was added to the mixture, and stirred for 30 minutes. Then, 4-(6-bromohexyloxy)phenol (2.5 g (grams)) and triethyl amine (13 ml (milliliters)) were added to the resulting reaction mixture, stirred at 0° C. (Celsius) for 1 hour, and then stirred at a room temperature overnight. Next day, a saturated ammonium chloride aqueous solution was poured into the reaction mixture, and the reaction was completed. The resulting reaction mixture was extracted three times with ethyl acetate (50 ml (milliliters)), and waster was removed over magnesium sulfate. Then, the solvents were evaporated, and the resulting reaction mixture was then purified using a column chromatography (developer solution: ethylacetate/hexane=1/2 volume ratio) to obtain 4-(6-bromo hexyloxy)phenyl 4-{[6-(acryloyloxy)hexyl]oxy}benzoate (5) (3 g (grams)).

(2) Synthesis of {{[(4-phenyl-diazine)-1-naphthyl-diazine]-phenyloxy}6-hexyloxy}4-phenyl 4-{[6-(acryloyloxy)hexyl}oxy]benzoate (compound of Formula (I))

The prepared 4-(6-bromo hexyloxy)phenyl 4-{[6-(acryloyloxy)hexyl]oxy}benzoate (5) (200 mg (milligrams)), Disperse Orange 13 (6) (128 mg (milligrams)), $K_2CO_3$ (150 mg (milligrams)) and butylated hydroxytoluene (BHT) (5 mg (milligrams)) were dissolved in acetone (20 ml (milliliters)) at a room temperature. The resulting reaction mixture was stirred at 70° C. (Celsius) overnight. Next day, a saturated ammonium chloride aqueous solution was poured into the reaction mixture to stop the reaction, and then extracted three times with ethylacetate (50 ml (milliliters)). Water was removed over magnesium sulfate, and the solvents were evaporated, and the resulting reaction mixture was then purified using a column chromatography (developer solution: ethylacetate/hexane=1/3 volume ratio) to obtain {{[(4-phenyl-diazine)-1-naphthyl-diazine]-phenyloxy}hexyloxy}4-phenyl 4-{[6-(acryloyloxy)hexyl]oxy}benzoate (I) (300 mg (milligrams)).

Scheme:
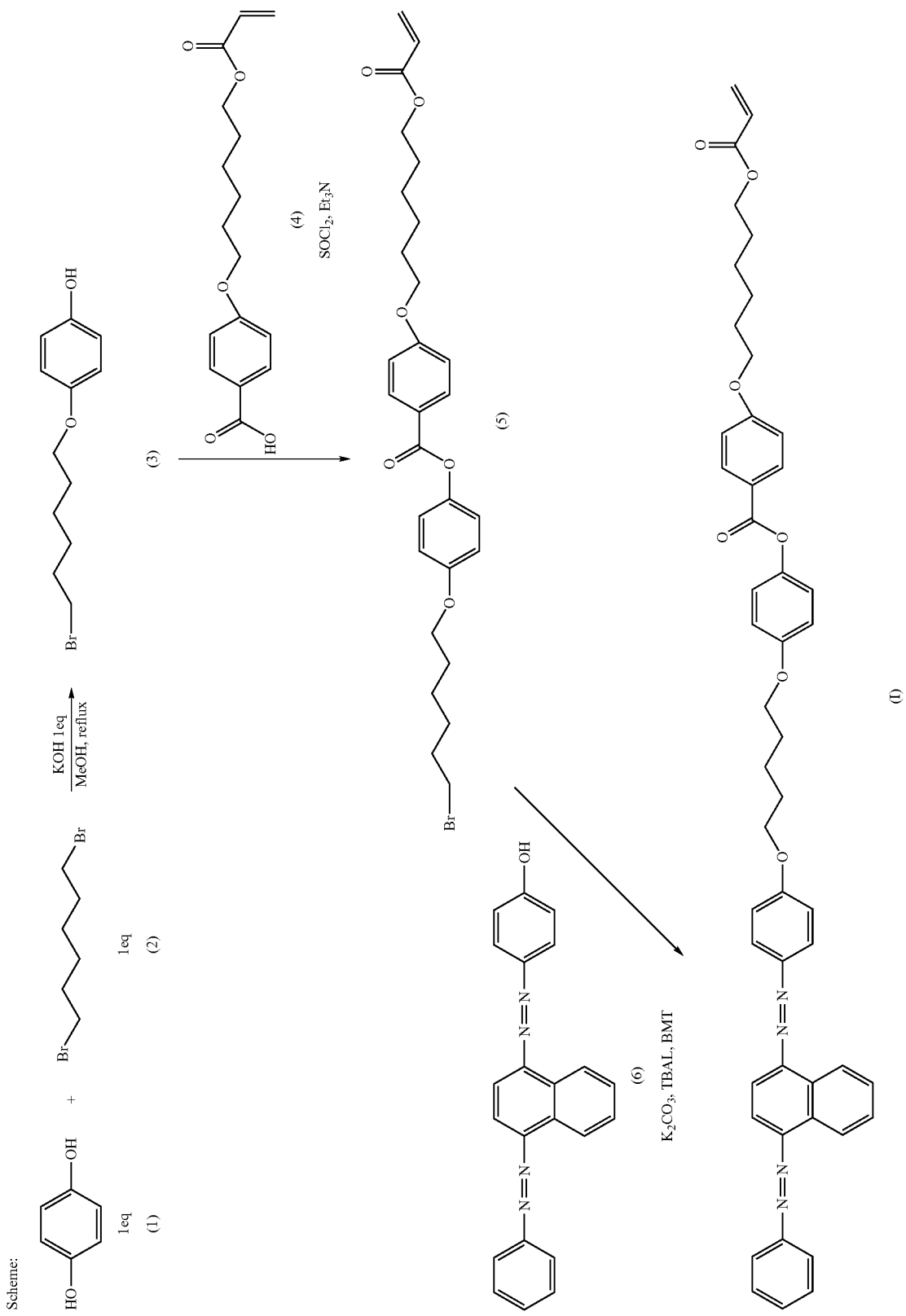

Synthetic Example 2

Synthesis of {{[(4-normalhexyl-phenyl-diazine)-1-naphthyl-diazine]-phenyloxy}6-hexyloxy}4-pheny-4-{[6-(acryloyloxy)hexyl]oxy}benzoate (Compound of Formula (II))

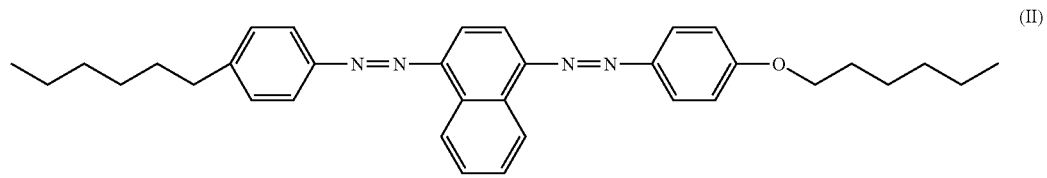

(II)

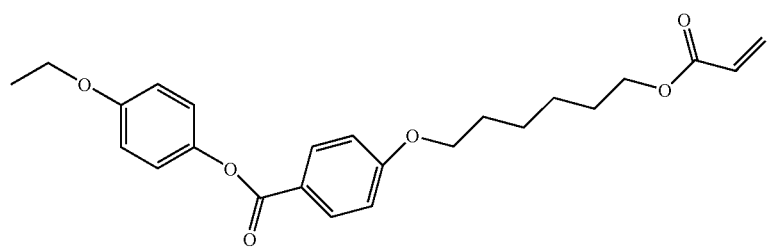

4-(6-bromo hexyloxy)phenyl 4-{[6-(acryloyloxy)hexyl]oxy}benzoate (compound of Formula (5) prepared in the step (1) of Synthetic example 1) (200 mg (milligrams)), {{[(4-normalhexyl-phenyl)diazenyl]-1-naphthyl}diazenyl}-4-phenol (135 mg (milligrams)), $K_2CO_3$ (150 mg (milligrams)) and BHT (5 mg (milligrams)) were dissolved in acetone (20 ml (milliliters)) at a room temperature. The reaction mixture was stirred at 70° C. (Celsius) overnight. Next day, a saturated ammonium chloride aqueous solution was poured into the resulting reaction mixture to stop the reaction, and then extracted three times with ethylacetate (50 ml (milliliters)). Water was removed over magnesium sulfate, and the solvents were evaporated, and the resulting reaction mixture was then purified using a column chromatography (developer solution: ethylacetate/hexane=1/5 volume ratio) to obtain {{[(4-normalhexyl-phenyl-diazine)-1-naphthyl-diazine]-phenyloxy}6-hexyloxy}4-pheny, 4-{[6-(acryloyloxy)hexyl]oxy}benzoate (compound of Formula (II)) (300 mg (milligrams)).

Synthetic Example 3

(1) Synthesis of 4-(6-acryloyloxy-hexyloxy)-benzoic acid 4-(5-bromo-phenyloxy)-phenyl ester 4-(6-acryloyloxy-hexyloxy)-benzoic acid 4-(5-bromo-phenyloxy)-phenyl ester was synthesized in the same manner as in the step (1) of Synthetic example 1, except that 1,5-dibromo pentane was used instead of 1,6-dibromo hexane in the reaction with hydroquinone that is the first step in the step (1) of the Synthetic example 1.

(2) Synthesis of {{[(4-phenyl-diazine)-1-naphthyl-diazine]-phenyloxy}6-pentyloxy}4-phenyl, 4-{[6-(acryloyloxy)hexyl]oxy}benzoate (Compound of Formula (III))

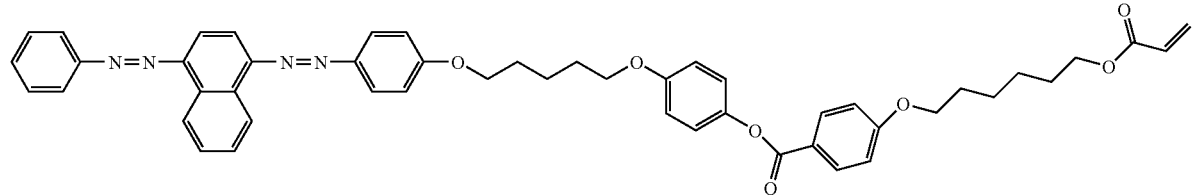

(III)

147 mg (milligrams) of Disperse Orange 13 and 155.43 mg (milligrams) of $K_2CO_3$ were dissolved in 30 ml (milliliters) of acetonitrile at a room temperature, and then stirred for approximately 15 minutes. Then, 4-(6-acryloyloxy-hexyloxy)-benzoic acid 4-(5-bromo-phenyloxy)-phenyl ester (synthesized in the step (1) of Synthetic example 3) (200 mg (milligrams)) and BHT (33.04 mg (milligrams)) was additionally added to the resulting reaction mixture, and boiled for 18 hours. Then, the resulting reaction mixture was washed twice with $NH_4Cl$ and once with NaCl to remove the organic solvent, and separated using a column chromatography (10:1 volume ratio, hexane:EtOAc) to obtain a compound of the Formula (III) (221 mg (milligrams), yield: 73%).

Example 1

Preparation of Optical Component Comprising an Optical Component Layer in which a Curable Dichroic Dye and a Curable Liquid Crystal Compound are Vertically Oriented An optical component sample comprising an optical component layer in which a curable dichroic dye and a curable liquid crystal compound are vertically oriented was prepared by coating a base substrate with the composition comprising the curable dichroic dye prepared in Synthetic example 1 and a liquid crystal mixture to form an optical component. The optical component sample is composed of a base substrate and an optical component layer.

21% by weight of a composition for forming an optical component was prepared by mixing 20% by weight of reactive liquid crystal RMM77™ (commercially available from Merck) with 1% by weight of the curable dichroic dye prepared in Synthetic example 1, dissolving the resulting mixture in 79% by weight of chloroform.

A separate airing agent was not added to the composition since the reactive liquid crystal RMM77™ (commercially available from Merck) comprises 5% by weight of a curing agent.

The composition for forming an optical component was spin-coated onto a glass substrate at a rotary speed of 1000 rpm for 30 seconds. Then, the spin-coated curable dichroic liquid crystal layers were dried at 50° C. (Celsius) for 1 minute. An optical component sample including a glass base substrate and an optical component layer in which a curable liquid crystal compound and a curable dichroic dye are vertically oriented were prepared by exposing the coating layer to a UV lamp with intensity of 100 mW/cm$^3$ (mW/square centimeters) at a rate of 3 meters/min. so that the liquid crystal and dye components can be cross-linked with each other. The thickness of the cured optical component layer was 0.9 μm (micrometers).

Figure 4:
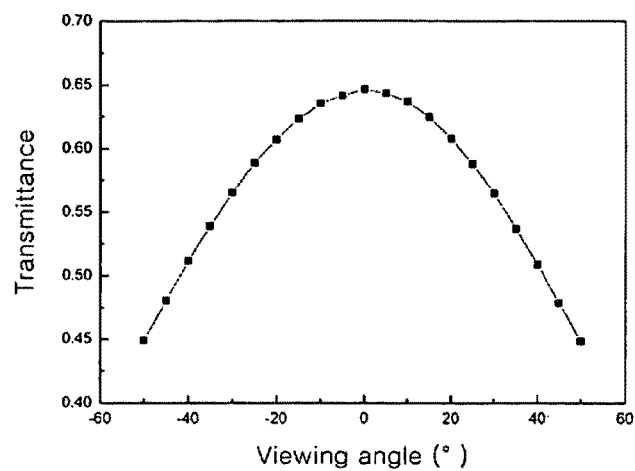
FIG. 4 is a graph illustrating the transmittance of an optical component sample prepared in Example 1.

The front transmittance of the optical component sample prepared in this embodiment of the present invention as measured at the maximum wavelength $\lambda_{max.}$=450 nm (nanometers) was 64.6%, and the lateral reduction ratio was 19.5%. These results are shown in FIG. 4.

Example 2

Preparation of Optical Component Comprising a Separate Alignment Layer and an Optical Component Layer in which a Unable Dichroic Dye and a Curable Liquid Crystal Compound are Vertically Oriented An optical component sample including an optical component layer in which a curable dichroic dye and a curable liquid crystal compound are vertically oriented was prepared by coating a base substrate with the composition comprising the curable dichroic dye prepared in Synthetic example 1 and a liquid crystal mixture to form an optical component. The optical component sample is composed of a base substrate, an alignment layer and an optical component layer.

Each of the compositions for forming an alignment layer was spin-coated onto a glass base substrate at a rotary speed of 1500 rpm for 30 seconds so that the alignment layer can have a thickness of 1000 Å (Angstrom), and then heated at 80° C. (Celsius) for 1 minute and 30 seconds and dried to remove the solvents inside the coating layer. The coating layer was cured to form an alignment layer by exposing the coating layer to a UV lamp with intensity of 100 mW/cm$^3$ (mW/square centimeters) at a rate of 3 meters/min so that molecules in the coating layer can be optically cross-linked with each other.

As the composition for forming an alignment layer, a compound for forming an alignment layer comprising 1.7.9% by weight of pentaerythritol triacrylate, 30% by weight of pentaerythritol tetraacrylate, 50% by weight of Baytron-P, 0.1% by weight of dibutylated hydroxytoluene (BHT) and 2% by weight of Irgacure 184 was diluted with a solvent (a mixed solvent of 40% by weight of ethanol, 30% by weight of 1-propanol and 30% by weight of methoxyethanol) at a concentration of 10% by weight in respect to 100% by weight of the total solution.

A vertically oriented optical component layer was prepared by coating the alignment layer with 21% by weight of the composition for forming an optical component that was prepared by mixing 1% by weight of the curable dichroic dye prepared in Synthetic example 1 with 20% by weight of reactive liquid crystal RMM77™ (commercially available from Merck) and dissolving the resulting mixture in 79% by weight of chloroform.

A separate curing agent was not added to the composition since the reactive liquid crystal RMM77™ (commercially available from Merck) comprises 5% by weight of a curing agent.

The composition for forming an optical component was spin-coated onto the alignment layer at a rotary speed of 1000 rpm for 30 seconds. Then, the spin-coated composition layer for forming an optical component was dried at 50° C. (Celsius) for 1 minute.

An optical component sample including a glass base substrate and an optical component layer in which a curable liquid crystal compound and a curable dichroic dye are vertically oriented were prepared by exposing the coating layer to a UV lamp with intensity of 100 mW/cm$^3$ (mW/square centimeters) at a rate of 3 meters/min. so that the liquid crystal and dye components can be cross-linked with each other. The thickness of the cured optical component layer was 0.9 μm (micrometers).

Figure 5:
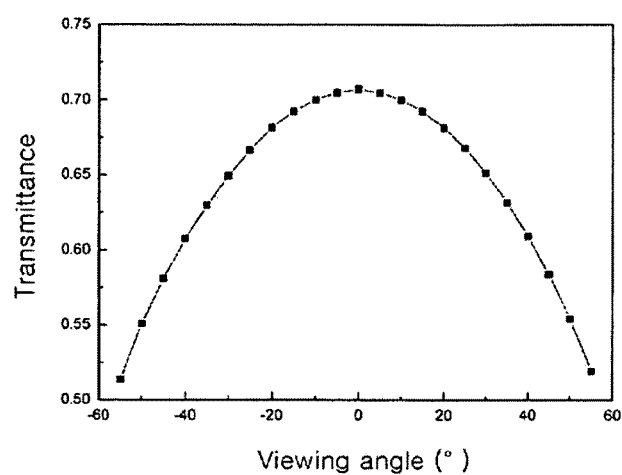
FIG. 5 is a graph illustrating the transmittance of an optical component sample prepared in Example 2.

The front transmittance of the optical component sample prepared in this embodiment of the present invention as measured at the maximum wavelength $\lambda_{max.}$=450 nm (nanometers) was 70.7%, and the lateral reduction ratio was 19.3%. These results are shown in FIG. 5.

Example 3

Figure 6:
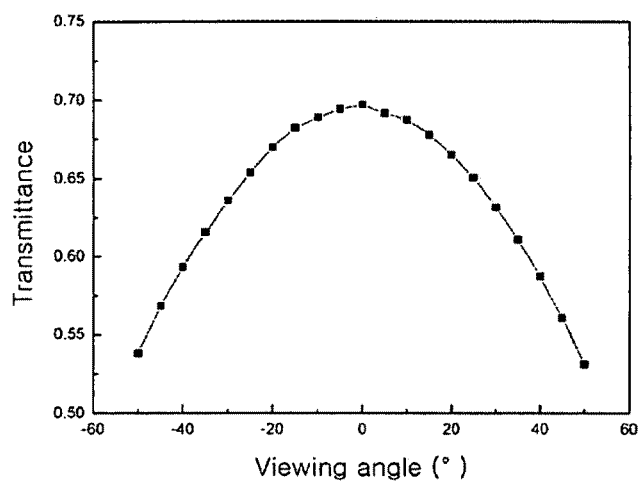
FIG. 6 is a graph illustrating the transmittance of an optical component sample prepared in Example 3.

An optical component sample was prepared in the same manner as in Example 1, except for the use of the dichroic dye of Synthetic example 2, and the narrow viewing angle, transmittance and orientation of the prepared optical component sample were measured at a wide wavelength range that respective dyes have. The front transmittance of the optical component sample as measured at the maximum wavelength $\lambda_{max.}$=450 nm (nanometers) was 71.2%, and the lateral reduction ratio was 17.3%. These results are shown in FIG. 6.

Example 4

Figure 7:
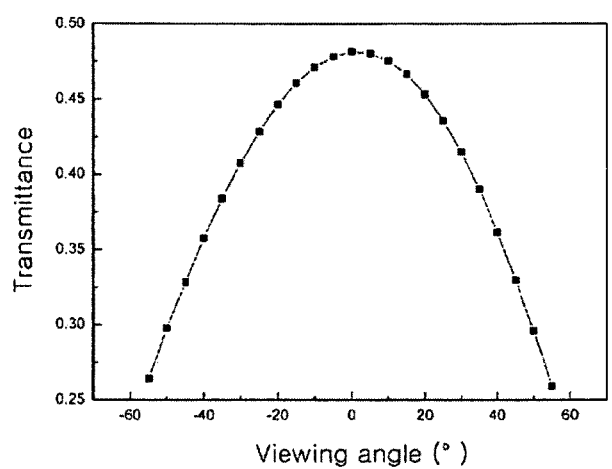
FIG. 7 is a graph illustrating the transmittance of an optical component sample prepared in Example 4.

An optical component sample was prepared in the same manner as in Example 1, except for the use of the dichroic dye of Synthetic example 3, and the narrow viewing angle, transmittance and orientation of the prepared optical component sample were measured at a wide wavelength range that respective dyes have. The front transmittance of the optical component sample as measured at the maximum wavelength $\lambda_{max.}$=422 nm (nanometers) was 48.2%, and the lateral reduction ratio was 22.2%. These results are shown in FIG. 7.

Comparative Example 1

An optical component sample was prepared in the same manner as in Example 2, except that the dichroic dye prepared in Synthetic example 1 is not used in Comparative example 1.

The front transmittance of the optical component sample prepared in this Comparative example 1 as measured at the maximum wavelength $\lambda_{max.}$=450 nm (nanometers) was 90.7%, and the lateral reduction ratio was 85.6%. These results are shown in FIG. 8.

Figure 8:
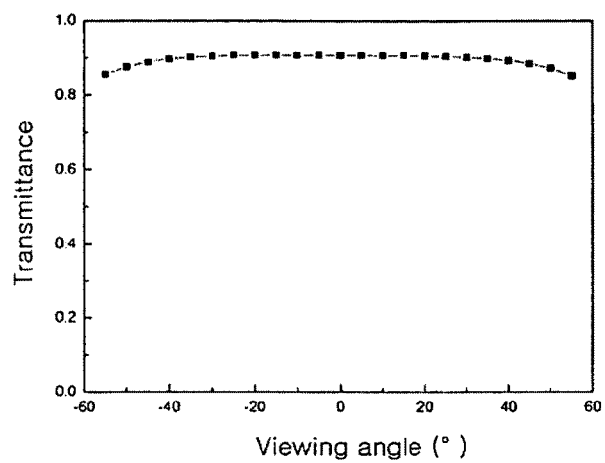
FIG. 8 is a graph illustrating the transmittance of an optical component sample prepared in Comparative example 1.

As shown in FIG. 8 it was revealed that the difference in the front transmittance and the lateral transmittance does not nearly exist on the optical component of Comparative example 1 when the dichroic dye is not used in the optical component. Also, it was seen that the front transmittance is 90.7% and the lateral transmittance is 85.6% in aspect of the numerical consideration, which indicates that there is no optical anisotropy in the optical component according to the viewing angle.

Comparative Example 2

Comparative example 2 was designed to confirm an effect of the dichroic dye according to one embodiment of the present invention in which a liquid crystalline stricture is chemically coupled to a dye structure. Then, an optical component sample was prepared in the same manner as in Example 1, except that 1% by weight of dichroic dye (RSY013) represented by the following Formula (4) that does not comprise a liquid crystalline structure was used as the dye.

Figure 9:
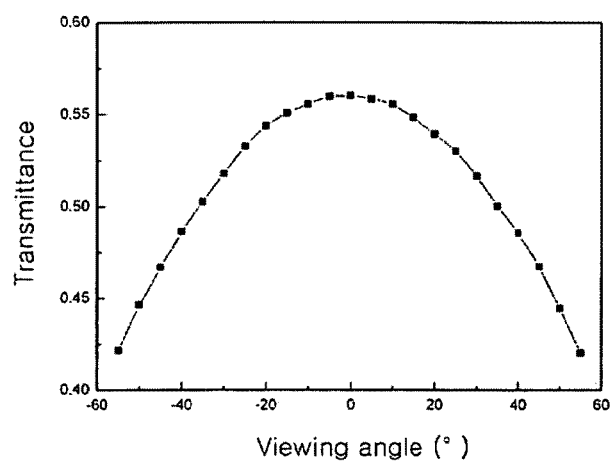
FIG. 9 is a graph illustrating the transmittance of an optical component sample prepared in Comparative example 2.

The front transmittance of the optical component sample prepared in this Comparative example 2 as measured at the maximum wavelength $\lambda_{max.}$=450 nm (nanometers) was 55.9%, and the lateral reduction ratio was 14.4%. These results are shown in FIG. 9.

The optical component sample of Comparative example 2 had a reduced front transmittance and a lowered lateral reduction ratio due to the poor orientations of the dichroic dye and the liquid crystal material. Therefore, it was confirmed that the polarization degree of the optical component is improved due to the improved compatibility of the liquid crystal material with the dichroic dye since the liquid crystalline structure is chemically coupled to the dye stricture in the dichroic dye according to one embodiment of the present invention. Accordingly, it was revealed that the optical component sample of Comparative example 2 has a larger reduction in transmittance due to the poor compatibility of the dichroic dye with the liquid crystal material, compared to the optical component samples of the Examples.

Comparative Example 3

Comparative example 3 was designed to confirm an effect of the dichroic dye according to one embodiment of the present invention in which a liquid crystalline structure is chemically coupled to a dye stricture. An optical component sample was prepared in the same manner as in Example 1, except that 1% by weight of dichroic dye (GHL2-127) represented by the following Formula (5) that does not comprise a liquid crystalline structure was used as the dye.

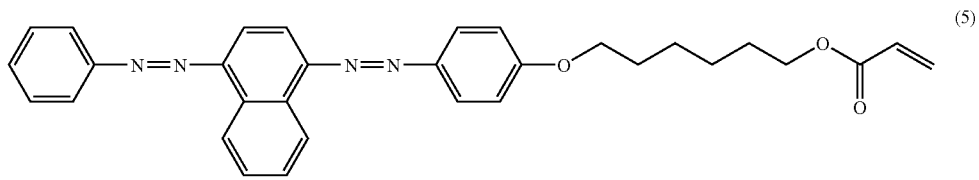

(5)

Figure 10:
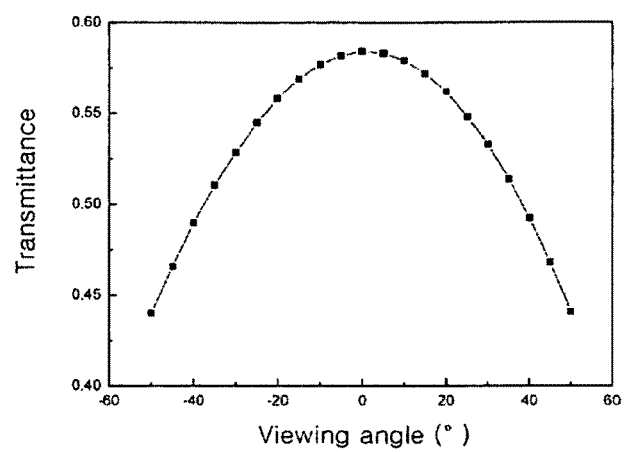
FIG. 10 is a graph illustrating the transmittance of an optical component sample prepared in Comparative example 3.

The front transmittance of the optical component sample prepared in this Comparative example 3 as measured at the maximum wavelength $\lambda_{max.}$=444 nm (nanometers) was 58.4%, and the lateral reduction ratio was 14.4%. These results are shown in FIG. 10. It was revealed that the optical component sample of Comparative example 3 has a larger reduction ratio in transmittance due to the poor compatibility of the dichroic dye with the liquid crystal material, compared to the optical component samples of the Examples.

Comparative Example 4

Comparative example 4 was designed to confirm an effect of the dichroic dye according to one embodiment of the present invention in which a reactive stricture is chemically

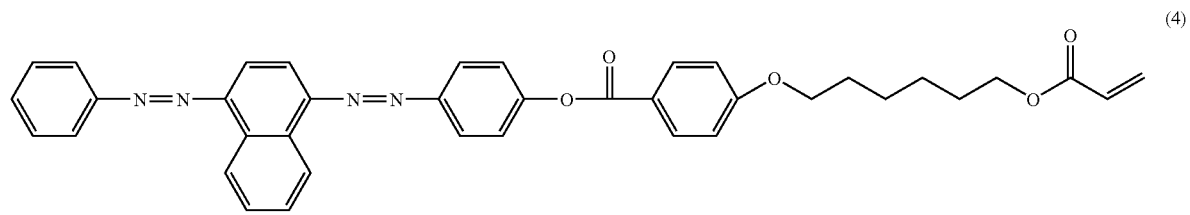 [SMILES: C=CC(=O)OCCCCCCOc1ccc(C(=O)Oc2ccc(N=Nc3ccc(N=Nc4ccccc4)c4ccccc34)cc2)cc1]

(4)

coupled to a dye structure. An optical component sample (6) was prepared in the same manner as in Example 1, except that 1% by weight of Disperse Orange 13 by the following Formula (6) that does not comprise a reactive functional group was used as the dichroic dye.

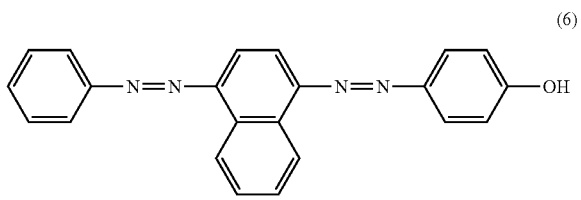 [SMILES: Oc1ccc(N=Nc2ccc(N=Nc3ccccc3)c3ccccc23)cc1]

(6)

Figure 11:
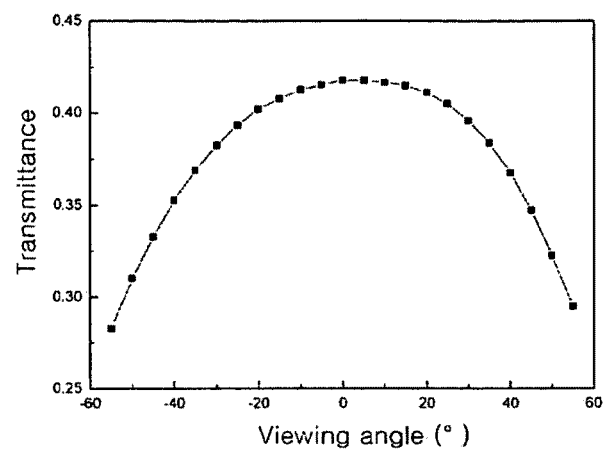
FIG. 11 is a graph illustrating the transmittance of an optical component sample prepared in Comparative example 4.

The front transmittance of the optical component sample (6) as measured at the maximum wavelength $\lambda_{max.}$=450 nm (nanometers) was 41.2%, and the lateral reduction ratio was 13.4%. These results are shown in FIG. 11. It was revealed that the optical component sample of Comparative example 4 has a highly lowered reduction ratios between the front transmittance and the lateral transmittance, and the degree of cure is also poor in a surface of the optical component sample and the durability of the films is deteriorated, compared to the optical component samples of the Examples.

Comparative Example 5

An optical component sample was prepared in the same manner as in Example 2, except that 1% by weight of dichroic dye (Solvent Orange 60) represented by the following Formula (7) that does not comprise a liquid crystalline structure was used as the dye in Comparative example 5.

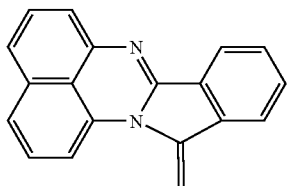

(7)

Figure 12:
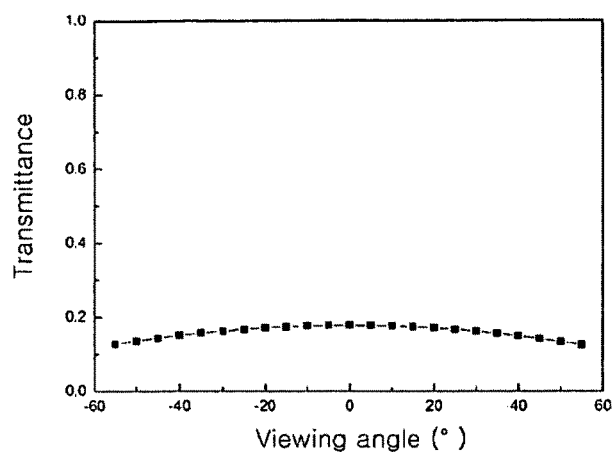
FIG. 12 is a graph illustrating the transmittance of an optical component sample prepared in Comparative example 5.

The front transmittance of the optical component sample prepared in Comparative example 5 as measured at the maximum wavelength $\lambda_{max.}$=480 nm (nanometers) was 17.8%, and the lateral transmittance was 12.8%, and therefore the reduction ratio in transmittance was very slight with 5.01%. The transmittances of the optical component sample of Comparative example 5 are shown in FIG. 12.

Comparative Example 6

An optical component sample was prepared in the same manner as in Example 1, except that 1% by weight of the dichroic dye prepared in Synthetic example 1 and 30% by weight of a conventional transparent coating agent mixture (a photocurable coating mixture comprising 20% by weight of dipentaerythritol hexaacrylate (DPHA), 8.5% by weight of acrylate oligomer (EB264, commercially available from SK-Cytec), 1.4% by weight of photoinitiator IRG184 (commercially available from Ciba), and 0.1% by weight of an additive F-470 (commercially available from DIC, JP) in 69% by weight of a solvent (a mixed solvent of 28.2% by weight of methyl ethyl ketone (MEK), 12.7% by weight of isopropanol (IPA), and 28.1% by weight of ethyl cellosolve (EC)) as the composition for forming an optical component were used in Comparative example 6. In the composition % by weight is based on the total weight of the composition. Then, optical component sample was measured for transmittance and narrow viewing angle.

Figure 13:
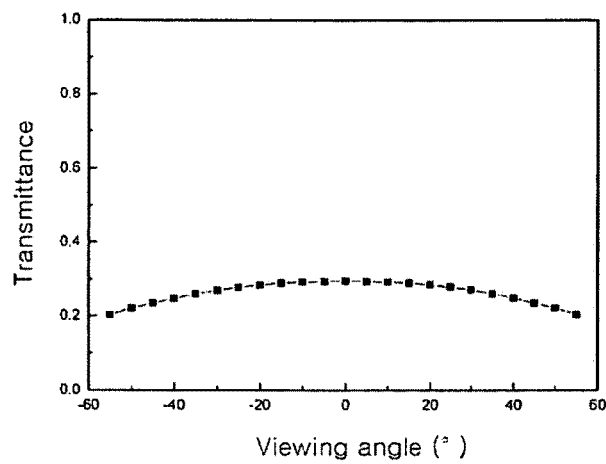
FIG. 13 is a graph illustrating the transmittance of an optical component sample prepared in Comparative example 6.

The front transmittance of the optical component sample as measured at the maximum wavelength $\lambda_{max.}$=450 nm (nanometers) was 29.5%, and the lateral transmittance was 19.2%, which indicates that the optical component is not nearly vertically oriented. The transmittances of the optical component sample of Comparative example 6 are shown in FIG. 13.

The invention claimed is:

1. A composition for forming an optical component, comprising 0.1-90 parts by weight of a curable dichroic dye and 10-98.85 parts by weight of a curable liquid crystal compound, wherein the curable liquid crystal compound is at least one selected from the group consisting of compounds represented by the following Formulas (1) to (3):

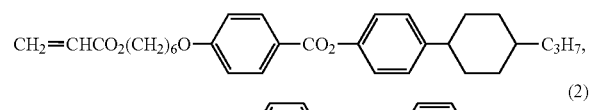

(1)

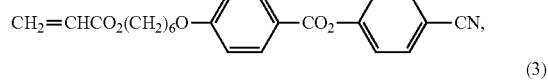

(2)

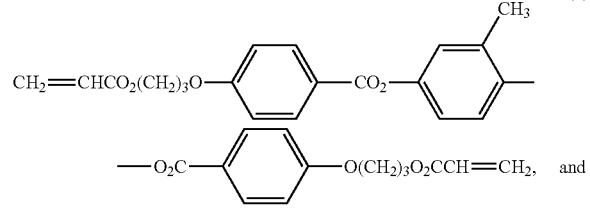

(3)

wherein the curable dichroic dye comprises curable dichroic dyes having the following structural formula:

R1-L1-[M, L, D]

in the structural formula of the dichroic dye, D represents a dichroic structure, M represents a liquid crystalline structure, R1 represents an end reactive functional group, L1 and L represent a linking structure to link R1, and D to each other, and the

[M, L, D]

block comprises one liquid crystalline structure M and 1 to 3 dichroic structures D1, D2 and D3, provided that if the

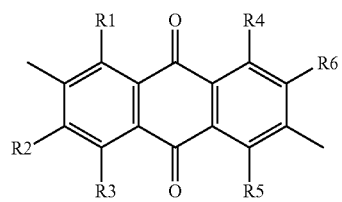

block comprises at least two dichroic structures, the dichroic structures may be linked to each other, or linked to another dichroic structure or the liquid crystalline structure via a linking structure L, M is liked to the adjacent dichroic structures D1, D2 and/or D3 through the linking structure L, wherein there is no limitation on the linking order of the liquid crystalline structure M and the dichroic structure D, and the dichroic structures D1, D2 and D3 are different from each other.

2. The composition of claim 1, wherein the dichroic structure D comprises at least one dye selected from the group consisting of azo, anthraquinone, azomethine, indigo, thioindigo, cyanine, indane, azulene, perylene, phthaloperin and azine dyes.

3. The composition of claim 2, wherein the azo dyes are selected from the group consisting of:

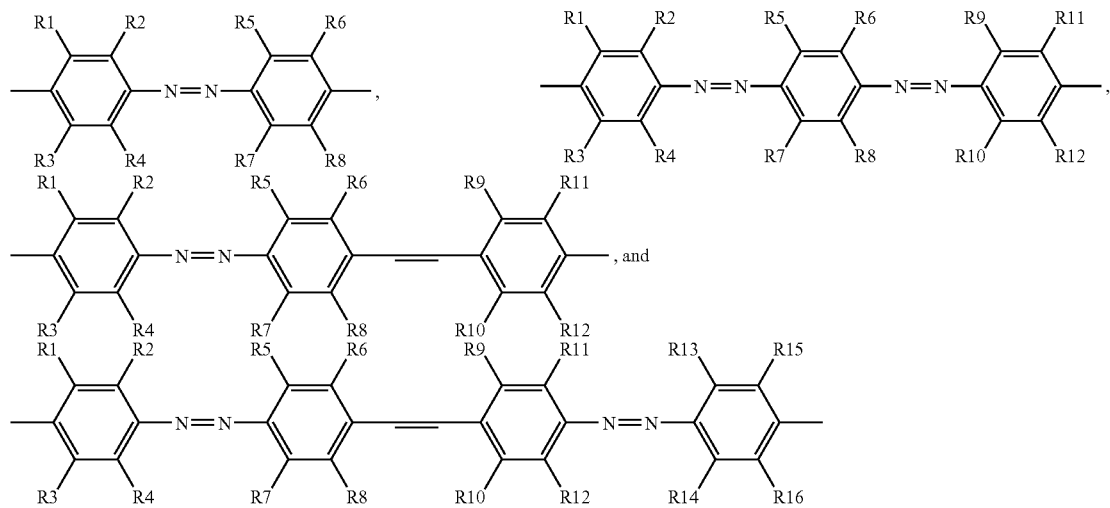

wherein, R1 through R16 are substituents selected from the group consisting of hydrogen; straight-chain or branched-chain alkyl group having carbon atoms of 1 to 20 such as methyl, ethyl, propyl, isopropyl, butyl, t-butyl, pentyl, hexyl, heptyl, octyl, 2-ethylhexyl, dodecyl, hexadecyl, cyclopropyl, cyclopentyl, cyclohexyl, 1-norbornyl and 1-adamantyl; halogens rich as fluoro, chloro, bromo and iodide; C1-C20 alkoxy group, C1-C20 aliphatic group, C1-C20 aliphatic amino group, C1-C20 aliphatic imino group, C1-C20 aliphatic alkyl, imino group, C6-C20 aryl group, C5-C20 heterocyclic group, cyano group, C1-C20 carboxyl group, carbamoyl group, C1-C20 aliphatic oxy carbonyl group, C6-C20 aryloxy carbonyl group, C1-C20 acyl group, hydroxy group, C1-C20 aliphatic oxy group, C6-C20 aryloxy group, C1-C20 acyloxy group, carbamoyloxy group, C5-C20 heterocyclic oxy group, C1-C20 aliphatic oxy carbonyloxy group, N—C1-C20 alkylacylamino group, carbamoylamino group, sulfamoylamino group, C1-C20 aliphatic oxy carbonylamino group, C6-C20 aryloxycarbonylamino group, C1-C20 aliphatic sulfonylamino group, C5-C20 arylsulfonylamino group, C1-C20 aliphatic thio group, C6-C20 arylthio group, C1-C20 aliphatic sulfonyl group, C6-C20 arylsulfonyl group, sulfamoyl group, sulfo group, and imide group, or R5 and R6 or R7 and R8 are linked to each other to form a phenyl group;

the anthraquinone dyes are selected from the group consisting of the following group and an imide group, wherein, R1 through R6 are substituents selected from the group consisting of hydrogen; straight-chain or branched-chain alkyl groups having carbon atoms of 1 to 20 such as methyl, ethyl, propyl, isopropyl, butyl, 1-butyl, pentyl, hexyl, heptyl, octyl, 2-ethylhexyl, dodecyl, hexadecyl, cyclopropyl, cyclopentyl, cyclohexyl, 1-norbornyl and 1-adamantyl; halogens such as fluoro, chloro, promo and iodide; C1-C20 alkoxy group, C1-C20 aliphatic group, C1-C20 aliphatic amino group, C1-C20 aliphatic imino group, C1-C20 aliphatic alkyl imino group, C6-C20 aryl group, C5-C20 heterocyclic group, cyano group, C1-C20 carboxyl group, carbamoyl group, C1-C20 aliphatic oxy carbonyl group, C6-C20 aryl oxy carbonyl group, C1-C20 acyl group, hydroxy group, C1-C20 aliphatic oxy group, C6-C20 aryloxy group, C1-C20 acyloxy group, carbamoyloxy group, C5-C20 heterocyclic oxy group, C1-C20 aliphatic oxy carbonyloxy group, N—C1-C20 alkylacylamino group, carbamoylamino group, sulfamoylamino group, C1-C20 aliphatic oxy carbonylamino group, C6-C20 aryloxycarbonylamino group, C1-C20 aliphatic sulfonylamino group, C5-C20 arylsulfonylamino group, C1-C20 aliphatic thio group, C6-C20 arylthio group, C1-C20 aliphatic sulfonyl group, C6-C20 arylsulfonyl group, sulfamoyl group, sulfo group, and

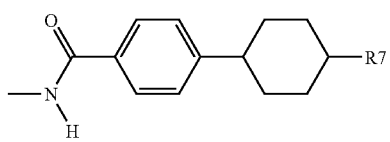

(wherein, R7 is defined as in the substituents R1 to R6);

the azomethine dyes are selected from the group consisting of:

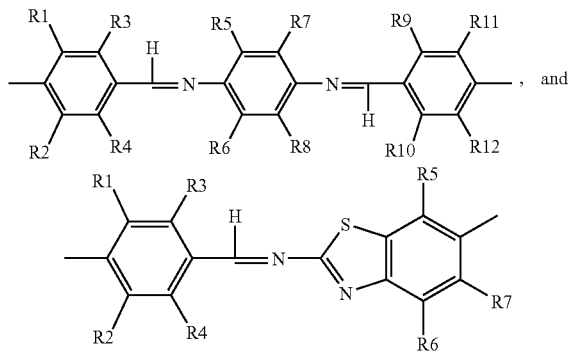

wherein, R1 through R12 are substituents selected from the group consisting of hydrogen; straight-chain or branched-chain alkyl groups having carbon atoms of 1 to 20 such as methyl, ethyl, propyl, isopropyl, butyl, t-butyl, pentyl, hexyl, heptyl, octyl, 2-ethylhexyl, dodecyl, hexadecyl, cyclopropyl, cyclopentyl, cyclohexyl, 1-norbornyl and 1-adamantyl; halogens such as fluoro, chloro, bromo and iodide; C1-C20 alkoxy group, C1-C20 aliphatic group, C1-C20 aliphatic amino group, C1-C20 aliphatic imino group, C1-C20 aliphatic alkyl imino group, C6-C20 aryl group, C5-C20 heterocyclic group, cyano group, C1-C20 carboxyl group, carbamoyl group, C1-C20 aliphatic oxy carbonyl group, C6-C20 aryl oxy carbonyl group, C1-C20 acyl group, hydroxy group, C1-C20 aliphatic oxy group, C6-C20 aryloxy group, C1-C20 acyloxy group, carbamoyloxy group, C5-C20 heterocyclic oxy group, C1-C20 aliphatic oxy carbonyloxy group, N—C1-C20 alkylacylamino group, carbamoylamino group, sulfamoylamino group, C1-C20 aliphatic oxy carbonylamino group, C6-C20 aryloxycarbonylamino group, C1-C20 aliphatic sulfonylamino group, C5-C20 arylsulfonylamino group, C1-C20 aliphatic thio group, C6-C20 arylthio group, C1-C20 aliphatic sulfonyl group, C6-C20 arylsulfonyl group, sulfamoyl group, sulfo group, and imide group;

the indigo and thioindigo dyes are selected from the group consisting of:

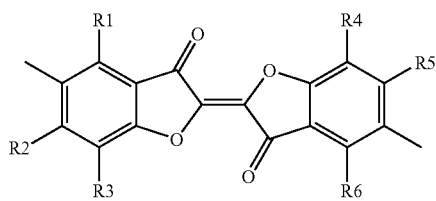

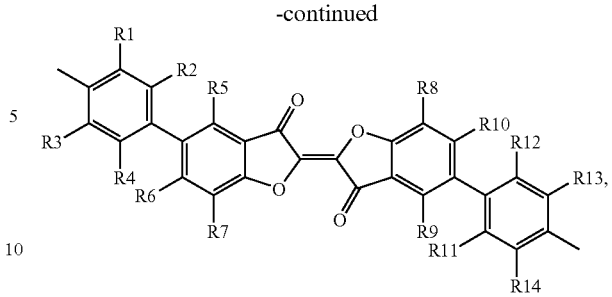

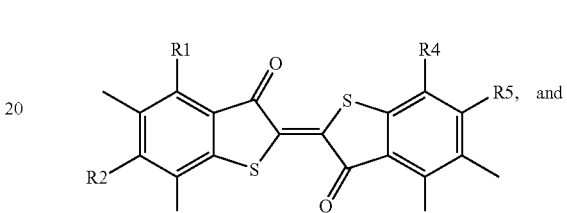

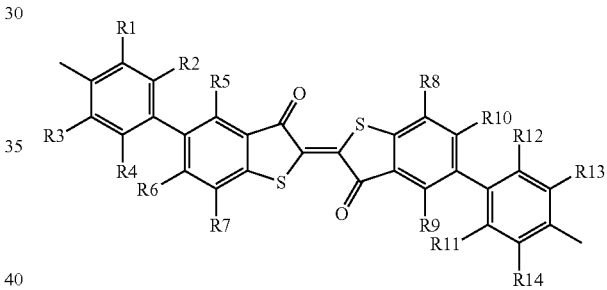

wherein, R1 through R14 are substituents selected from the group consisting of hydrogen; straight-chain or branched-chain alkyl groups having carbon atoms of 1 to 20 such as methyl, ethyl, propyl, isopropyl, butyl, t-butyl, pentyl, hexyl, heptyl, octyl, 2-ethylhexyl, dodecyl, hexadecyl, cyclopropyl, cyclopentyl, cyclohexyl, 1-norbornyl and 1-adamantyl; halogens such as fluoro, chloro, bromo and iodide; C1-C20 alkoxy group, C1-C20 aliphatic group, C1-C20 aliphatic amino group, C1-C20 aliphatic imino group, C1-C20 aliphatic alkyl imino group, C6-C20 aryl group, C5-C20 heterocyclic group, cyano group, C1-C20 carboxyl group, carbamoyl group, C1-C20 aliphatic oxy carbonyl group, C6-C20 aryl oxy carbonyl group, C1-C20 acyl group, hydroxy group, C1-C20 aliphatic oxy group, C6-C20 aryloxy group, C1-C20 acyloxy group, carbamoyloxy group, C5-C20 heterocyclic oxy group, C1-C20 aliphatic oxy carbonyloxy group, N—C1-C20 alkylacylamino group, carbamoylamino group, sulfamoylamino group, C1-C20 aliphatic oxy carbonylamino group, C6-C20 aryloxycarbonylamino group, C20 aliphatic sulfonylamino group, C5-C20 arylsulfonylamino group, C1-C20 aliphatic thio group, C6-C20 arylthio group, C1-C20 aliphatic sulfonyl group, C6-C20 arylsulfonyl group, sulfamoyl group, sulfo group, and imide group;

the cyanine dyes are selected from the group consisting of;

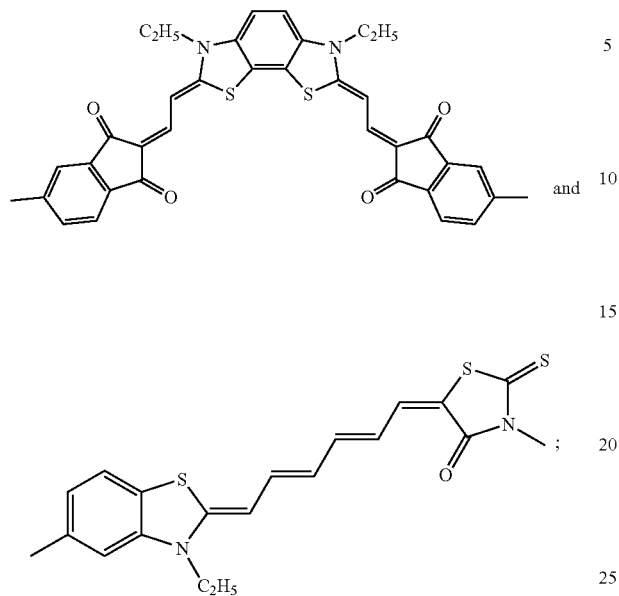

the indane dyes represent the following group:

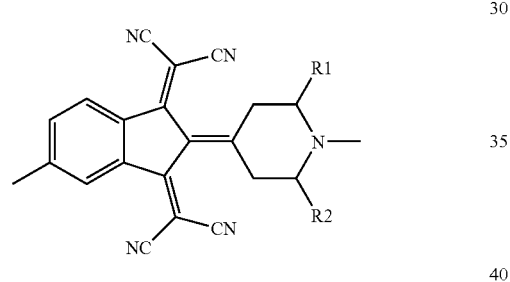

wherein, R1 and R2 are substituents selected from the group consisting of hydrogen; straight-chain or branched-chain alkyl groups having carbon atoms of 1 to 20 such as methyl, ethyl, propyl, isopropyl, butyl, t-butyl, pentyl, hexyl, heptyl, octyl, 2-ethylhexyl, dodecyl, hexadecyl, cyclopropyl, cyclopentyl, cyclohexyl, 1-norbornyl, and 1-adamantyl; halogens such fluoro, chloro, bromo and iodide; C1-C20 alkoxy group, C1-C20 aliphatic group, C1-C20 aliphatic amino group, C1-C20 aliphatic imino group, C1-C20 aliphatic alkyl imino group, C6-C20 aryl group, C5-C20 heterocyclic group, cyano group, C1-C20 carboxyl group, carbamoyl group, C1-C20 aliphatic oxy carbonyl group, C6-C20 aryl oxy carbonyl group, C1-C20 acyl group, hydroxy group, C1-C20 aliphatic oxy group, C6-C20 aryloxy group, C1-C20 acyloxy group, carbamoyloxy group, C5-C20 heterocyclic oxy group, C1-C20 aliphatic oxy carbonyloxy group, N—C1-C20 alkylacylamino group, carbamoylamino group, sulfamoylamino group, C1-C20 aliphatic oxy carbonylamino group, C6-C20 aryloxycarbonylamino group, C1-C20 aliphatic sulfonylamino group, C5-C20 arylsulfonylamino group, C1-C20 aliphatic thio group, C6-C20 arylthio group, C1-C20 aliphatic sulfonyl group, C6-C20 arylsulfonyl group, sulfamoyl group, sulfo group and imide group;

the azulene dyes are selected from the group consisting of:

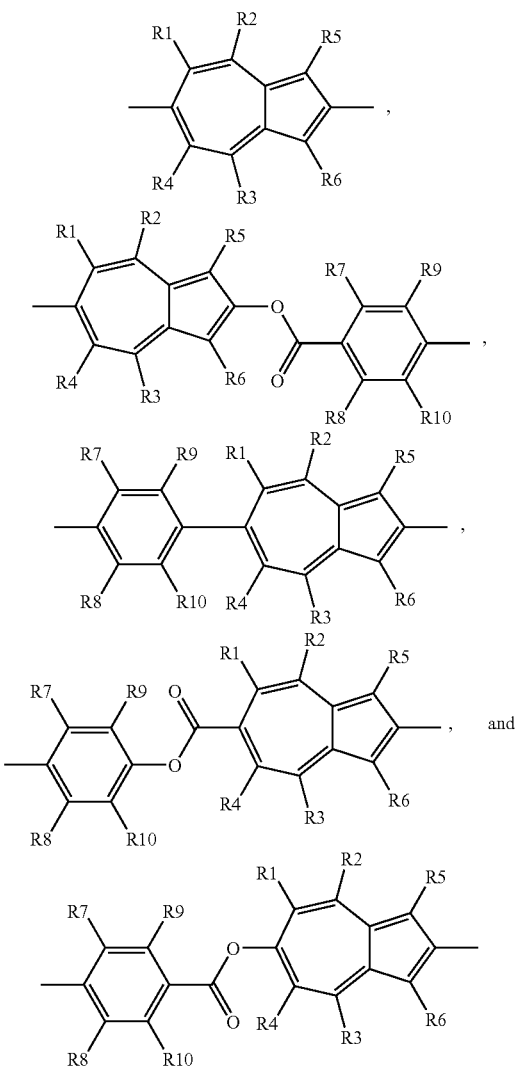

wherein, R1 through R10 are substituents is selected from the group consisting of hydrogen; straight-chain or branched-chain alkyl groups having carbon atoms of 1 to 20 such methyl, ethyl, propyl, isopropyl, butyl, t-butyl, pentyl, hexyl, heptyl, 2-ethylhexyl, dodecyl, hexadecyl, cyclopropyl, cyclopentyl, cyclohexyl, 1-norbornyl and 1-adamantyl; halogens such as fluoro, chloro, bromo and iodide; C1-C20 alkoxy group, C1-C20 aliphatic group, C1-C20 aliphatic amino group, C1-C20 aliphatic imino group, C1-C20 aliphatic alkyl imino group, C6-C20 aryl group, C5-C20 heterocyclic group, cyano group, C1-C20 carboxyl group, carbamoyl group, C1-C20 aliphatic oxy carbonyl group, C6-C20 aryl oxy carbonyl group, C1-C20 acyl group, hydroxy group, C1-C20 aliphatic oxy group, C6-C20 aryloxy group, C1-C20 acyloxy group, carbamoyloxy group, C5-C20 heterocyclic oxy group, C1-C20 aliphatic oxy carbonyloxy group, N—C1-C20 alkylacylamino group, carbamoylamino group, sulfamoylamino group, C1-C20 aliphatic oxy carbonylamino group, C6-C20 aryloxycarbonylamino group, C1-C20 aliphatic sulfonylamino group, C5-C20 arylsulfonylamino group, C1-C20 aliphatic thio group, C6-C20 arylthio group, C1-C20 aliphatic sulfonyl group, C6-C20 arylsulfonyl group, sulfamoyl group, sulfo group, and in group;

the perylene dyes are selected from the group consisting of:

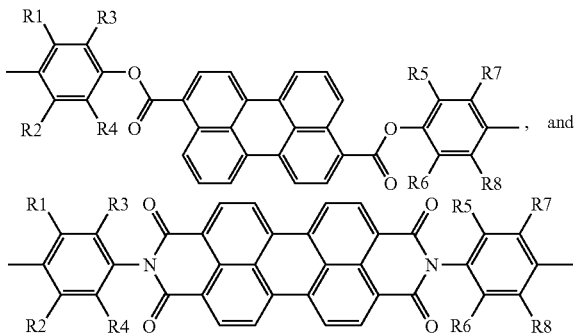

wherein, R1 through R8 are substituents is selected from the group consisting of hydrogen; straight-chain or branched-chain alkyl groups having carbon atoms of 1 to 20 such as methyl, ethyl, propyl, isopropyl, butyl, pentyl, hexyl, heptyl, 2-ethylhexyl, dodecyl, hexadecyl, cyclopropyl, cyclopentyl, cyclohexyl, 1-norbornyl and 1-adamantyl; halogen such as fluoro, chloro, bromo and iodide; C1-C20 alkoxy group, C1-C20 aliphatic group, C1-C20 aliphatic amino group, C1-C20 aliphatic imino group, C1-C20 aliphatic alkyl imino group, C6-C20 aryl group, C5-C20 heterocyclic group, cyano group, C1-C20 carboxyl group, carbamoyl group, C1-C20 aliphatic oxy carbonyl group, C6-C20 aryl oxy carbonyl group, C1-C20 acyl group, hydroxy group, C1-C20 aliphatic oxy group, C6-C20 aryloxy group, C1-C20 acyloxy group, carbamoyloxy group, C5-C20 heterocyclic oxy group, C1-C20 aliphatic oxy carbonyloxy group, N—C1-C20 alkylacylamino group, carbamoylamino group, sulfamoylamino group, C1-C20 aliphatic oxy carbonylamino group, C6-C20 aryloxycarbonylamino group, C1-C20 aliphatic sulfonylamino group, C5-C20 arylsulfonylamino group, C1-C20 aliphatic thio group, C6-C20 arylthio group, C1-C20 aliphatic sulfonyl group, C6-C20 arylsulfonyl group, sulfamoyl group, sulfo group, and imide group;

the phthaloperin dyes are selected from the group consisting of:

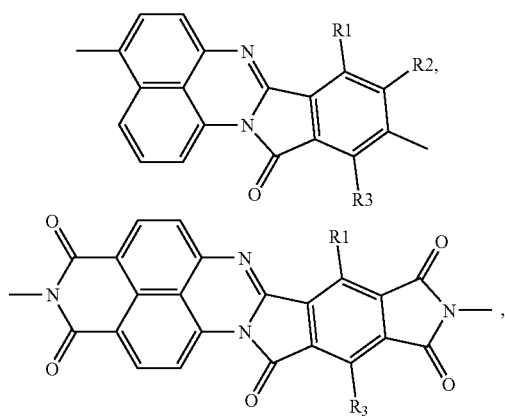

-continued

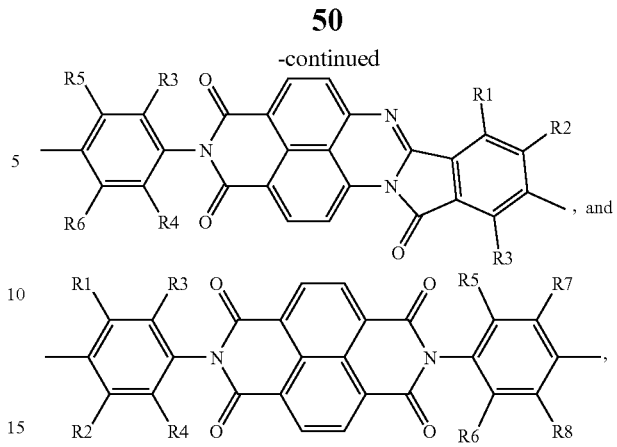

wherein, R1 through R8 are substituents is selected from the group consisting of hydrogen; straight-chain or branched-chain alkyl groups having carbon atoms of 1 to 20 such as methyl, ethyl, propyl, isopropyl, butyl, t-butyl, pentyl, hexyl, heptyl, octyl, 2-ethylhexyl, dodecyl, hexadecyl, cyclopropyl, cyclopentyl, cyclohexyl, 1-norbornyl and 1-adamantyl; halogens such as fluoro, chloro, bromo and iodide; C1-C20 alkoxy group, C1-C20 aliphatic group, C1-C20 aliphatic amino group, C1-C20 aliphatic imino group, C1-C20 aliphatic alkyl imino group, C6-C20 aryl group, C5-C20 heterocyclic group, cyano group, C1-CM carboxyl group, carbamoyl group, C1-C20 aliphatic oxy carbonyl group, C6-C20 aryl oxy carbonyl group, C1-C20 acyl group, hydroxy group, C1-C20 aliphatic oxy group, C6-C20 aryloxy group, C1-C20 aryloxy group, carbamoyloxy group, C5-C20 heterocyclic oxy group, C1-C20 aliphatic oxy carbonyloxy group, N—C1-C20 alkylacylamino group, carbamoylamino group, sulfamoylamino group, C1-C20 aliphatic oxy carbonylamino group, C6-C20 aryloxycarbonylamino group, C1-C20 aliphatic sulfonylamino group, C5-C20 arylsulfonylamino group, C1-C20 aliphatic thio group, C6-C20 arylthio group, C1-C"20 aliphatic sulfonyl group, C6-C20 arylsulfonyl group, sulfamoyl group, sulfo group, and imide group;

and the arsine dyes are selected from the group consisting of:

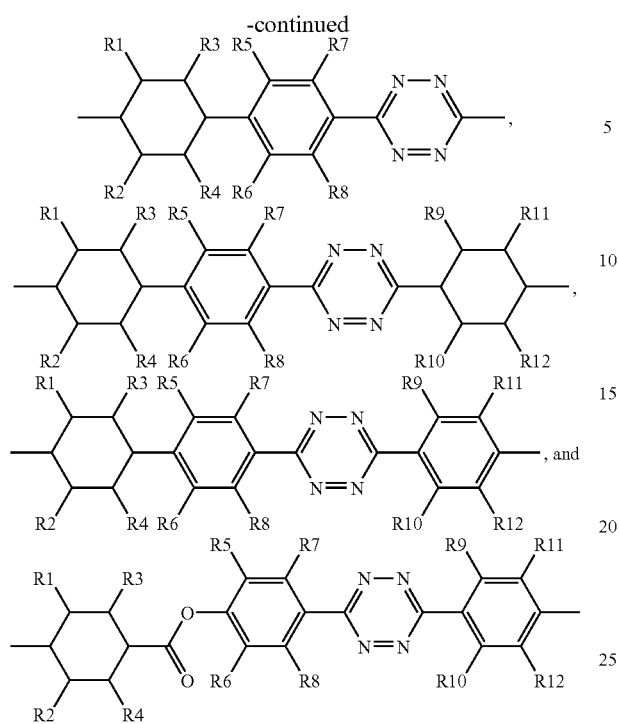

wherein, R1 and R12 are substituents is selected from the group consisting of hydrogen; straight-chain or branched-chain alkyl groups having carbon atoms of 1 to 20 such as methyl, ethyl, propyl, isopropyl, butyl, 1-butyl, pentyl, hexyl, heptyl, octyl, 2-ethylhexyl, dodecyl, hexadecyl, cyclopropyl, cyclopentyl, cyclohexyl, 1-norbornyl and 1-adamantyl; halogens rich as fluoro, chloro, bromo and iodide; C1-C20 alkoxy group; C1-C20 aliphatic group, C1-C20 aliphatic amino group, C1-C20 aliphatic imino group, C1-C20 aliphatic alkyl imino group, C6-C20 aryl group, C5-C20 heterocyclic group, cyano group, C1-C20 carboxyl group, carbamoyl, group, C1-C20 aliphatic oxy carbonyl group, C6-C20 aryl oxy carbonyl group, C1-C20 acyl group, hydroxy group, C1-C20 aliphatic oxy group, C6-C20 aryloxy group, C1-C20 acyloxy group, carbamoyloxy group, C5-C20 heterocyclic oxy group, C1-C20 aliphatic oxy carbonyloxy group, N—C1-C20 alkylacylamino group, carbamoylamino group, sulfamoylamino group, C1-C20 aliphatic oxy carbonylamino group, C6-C20 aryloxycarbonylamino group, C1-C20 aliphatic sulfonylamino group, C5-C20 arylsulfonylamino group, C1-C20 aliphatic thio group, C6-C20 arylthio group, C1-C20 aliphatic sulfonyl group, C6-C20 arylsulfonyl group, sulfamoyl group, sulfo group, and imide group.

4. The composition of claim 1 wherein the dichroic structure D has an additional liquid crystalline property.

5. The composition of claim 1, wherein the liquid crystalline structure M is selected from the group consisting of:

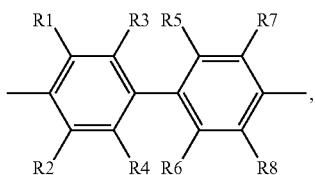

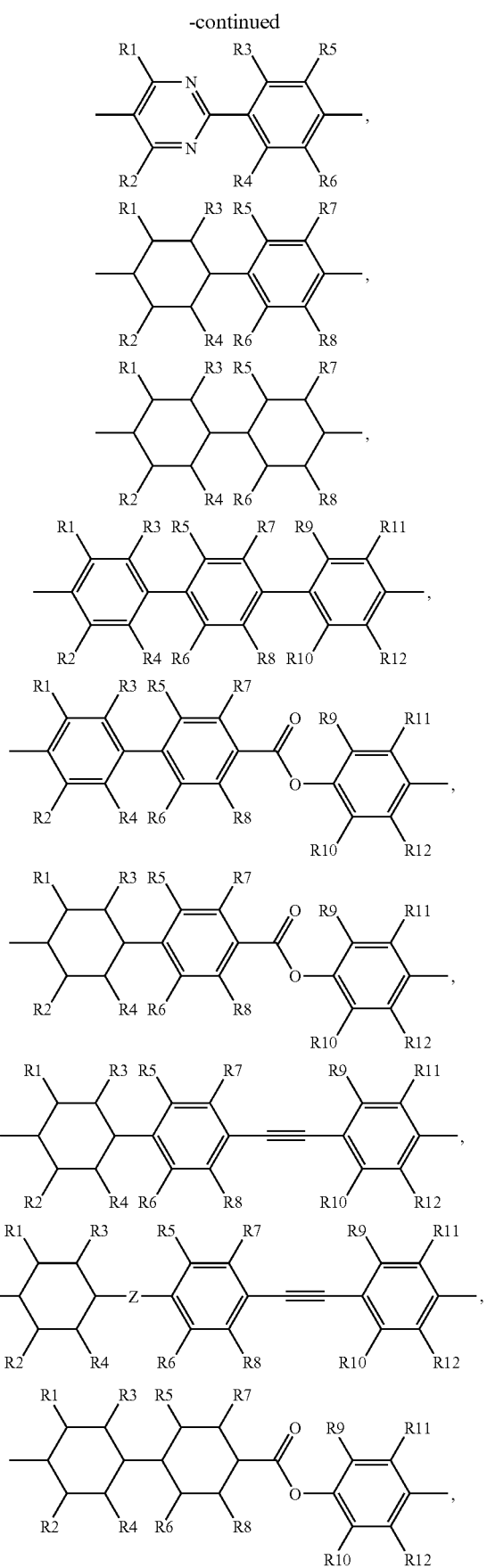

-continued

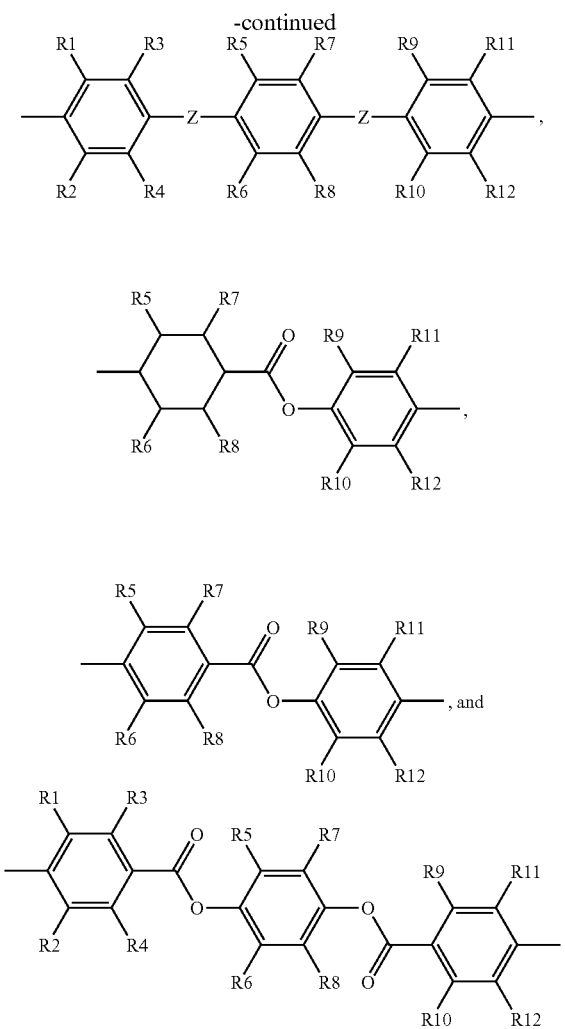

wherein, Z is —COO—, —OCO—, —CH₂CH₂—, —CH=CH—, —C≡C— or a single bond,

R1 through R12 are substituents selected from the group consisting of hydrogen, straight-chain or branched-chain alkyl group having carbon atoms of 1 to 20, such as methyl, ethyl, propyl, isopropyl, t-butyl, t-butyl, pentyl, hexyl, heptyl, octyl, 2-ethylhexyl, dodecyl, hexadecyl, cyclopropyl, cyclopentyl, cyclohexyl, 1-norbornyl and 1-adamantyl, halogen such as fluoro, chloro, bromo and iodide, C1-C20 alkoxy group, C1-C20 aliphatic group, C1-C20 aliphatic amino group, C1-C20 aliphatic imino group, C1-C20 aliphatic alkyl imino group, C6-C20 aryl, group, C5-C20 heterocyclic group, cyano group, C1-C20 carboxyl group, carbamoyl group, C1-C20 aliphatic oxy carbonyl group, C6-C20 aryl, oxy carbonyl group, C1-C20 acyl group, hydroxy group, C1-C20 aliphatic oxy group, C6-C20 aryloxy group, C1-C20 acyloxy group, carbamoyloxy group, C5-C20 heterocyclic oxy group, C1-C20 aliphatic oxy carbonyloxy group, N—C1-C20 alkylacylamino group, carbamoylamino group, sulfamoylamino group, C1-C20 aliphatic oxy carbonylamino group, C6-C20 aryloxycarbonylamino group, C1-C20 aliphatic sulfonylamino group, C5-C20 arylsulfonylamino group, C1-C20 aliphatic thio group, C6-C20 arylthio group, C1-C20 aliphatic sulfonyl group, C6-C20 arylsulfonyl group, sulfamoyl group, sulfo group, and imide group.

6. The composition of claim 1, wherein the end reactive functional group R1 is selected from the group consisting of

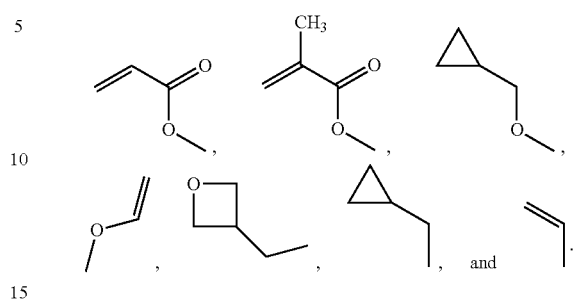

7. The composition of claim 1, wherein the dichroic dye has a structure R1-L1-M,L,D-L3-R2 which further comprises a functional terminal group R2 and a linking structure L3 bound to the other end of the M,L,D block that is free from the end reactive functional group R1 and the linking structure L1.

8. The composition of claim 7, wherein the functional terminal group R2 comprises a reactive functional group selected from the group consisting of

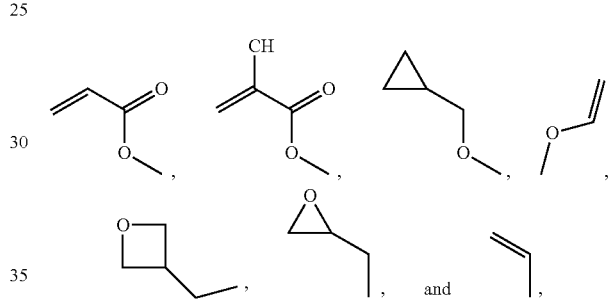

or a non-reactive functional group selected from the group consisting of C1-C20 alkyl, C1-C20 alkoxy and cyclohexyl groups.

9. The composition of claim 1, wherein the linking structures are identical to, or different from each other, and each independently selected from the group consisting of

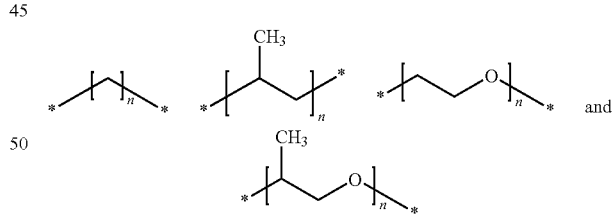

(wherein, n is integer ranging from 1 to 12).

10. The composition of claim 1, further comprising a curing agent.

11. The composition of claim 10, wherein the curing agent is at least one selected from the group consisting of halomethyloxadiazole compounds, halomethyl-S-triazine compounds, 3-aryl-substituted coumarin compounds, benzophenone compounds, acetophenone compounds and derivatives thereof, cyclopentadiene-benzene-iron complexes and salts thereof, oxime compounds, and azoisobutyronitrile compounds.

12. The composition of claim 10, wherein the curing agent is mixed in a content of 1-10 parts by weight.

13. An optical component comprising a base substrate and an optical component layer in which a curable liquid crystal compound and a curable dichroic dye are vertically oriented, the optical component layer being formed on the base substrate and made of the composition for forming an optical component defined in claim 1.

14. The optical component of claim 13, wherein the vertical orientation is endowed by at least one selected, from the group consisting of (1) a curable liquid crystal compound comprised in the composition for forming an optical component defined in claim 1, (2) a vertically orientated additive added to the composition for forming an optical component defined in claim 1, (3) an orientation given to a base substrate itself, and (4) a separate alignment layer formed on the base substrate.

* * * * *